United States Patent

Langridge

(10) Patent No.: US 8,777,708 B2
(45) Date of Patent: Jul. 15, 2014

(54) TARGETING CONTROL IN A SIMULATED ENVIRONMENT

(75) Inventor: Adam J. Langridge, Guildford (GB)

(73) Assignee: Microsoft Corporation, Redmond, WA (US)

(*) Notice: Subject to any disclaimer, the term of this patent is extended or adjusted under 35 U.S.C. 154(b) by 1523 days.

(21) Appl. No.: 12/147,484

(22) Filed: Jun. 27, 2008

(65) Prior Publication Data

US 2009/0325660 A1 Dec. 31, 2009

(51) Int. Cl.
*A63F 13/00* (2014.01)

(52) U.S. Cl.
USPC ............ 463/5; 463/7; 463/37; 463/38

(58) Field of Classification Search
USPC ............ 463/1, 2, 5, 7, 36–38
See application file for complete search history.

(56) References Cited

U.S. PATENT DOCUMENTS

| | | | |
|---|---|---|---|
| 4,584,776 A | 4/1986 | Shepherd | |
| 5,354,057 A | 10/1994 | Pruitt et al. | |
| 5,616,031 A | 4/1997 | Logg | |
| 2005/0272496 A1 | 12/2005 | Reinish et al. | |
| 2006/0084509 A1* | 4/2006 | Novak et al. | 463/49 |
| 2006/0199626 A1* | 9/2006 | Ortiz et al. | 463/2 |
| 2006/0219094 A1 | 10/2006 | Padan | |
| 2006/0252538 A1 | 11/2006 | Olsen et al. | |
| 2007/0216102 A1 | 9/2007 | Matilla et al. | |
| 2007/0270215 A1 | 11/2007 | Miyamoto et al. | |
| 2009/0181736 A1* | 7/2009 | Haigh-Hutchinson et al. | 463/2 |

FOREIGN PATENT DOCUMENTS

| | | | | |
|---|---|---|---|---|
| JP | 08-257241 | * | 10/1996 | A63F 9/22 |
| JP | 08-276075 | * | 10/1996 | A63F 9/22 |

OTHER PUBLICATIONS

Shadowrun Interview, from http://pc.ign.com/articles/740/740187p1.html written on Oct. 19, 2006, pp. 1-8.*
"Dirge of Cerberus: Final Fantasy VII", Aug. 21, 2006. http://www.gamingtarget.com/article.php?artid=5893.
"General Gameplay Instructions" http://www.elitepvpers.de/forum/tabula-rasa/95053-general-gameplay-instructions.html, Sep. 20, 2007.
"Hotkeys (Mouse, Joystick and Keyboard Shortcuts)" http://www.autohotkey.com/docs/Hotkeys.htm, 2006 (date retrieved from https://web.archive.org/web/20060501000000*/http://www.autohotkey.com/docs/Hotkeys.htm.
"SpecialControlCannon" http://wiki.beyondunreal.com/wiki/SpecialControlCannon, Sep. 12, 2005 (date retrieved from https://web.archive.org/web/20050912144852/http://wiki.beyondunreal.com/wiki/SpeicalControlCannon.

* cited by examiner

*Primary Examiner* — Arthur O Hall
*Assistant Examiner* — Jasson Yoo
(74) *Attorney, Agent, or Firm* — Micah Goldsmith; Glen Johnson; Micky Minhas

(57) ABSTRACT

Targeting control may be facilitated in a simulated environment. In an example embodiment, a method includes acts of monitoring, generating, moving, and firing. A button input and a directional input are monitored. If a press and hold of the button input is detected, a fine aiming mode is generated. If movement of the directional input is detected during the fine aiming mode, a location of a target indicator is moved responsive to the detected movement. When a release of the button input is detected, a ranged weapon is fired based on the location of the target indicator.

20 Claims, 20 Drawing Sheets

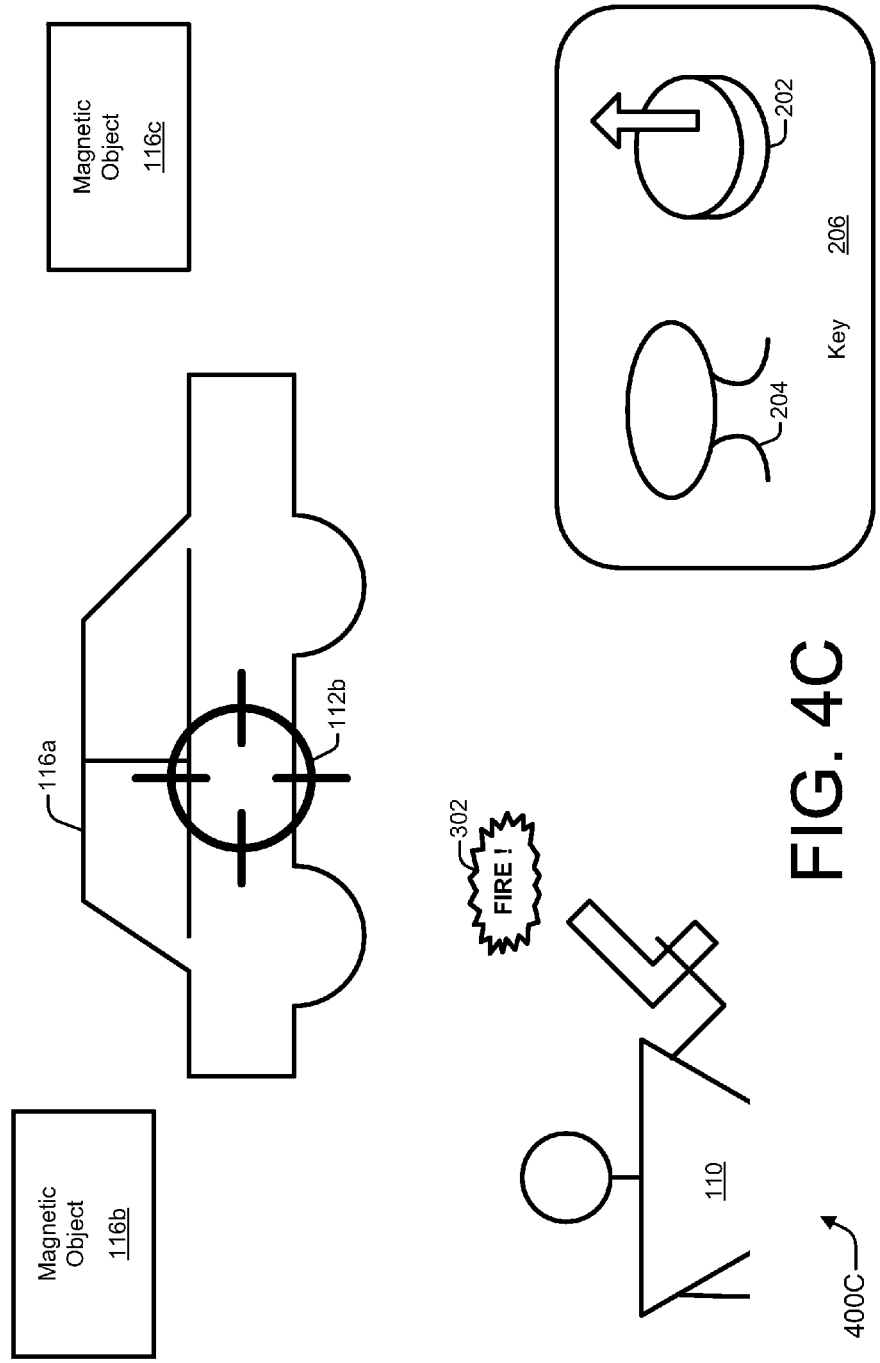

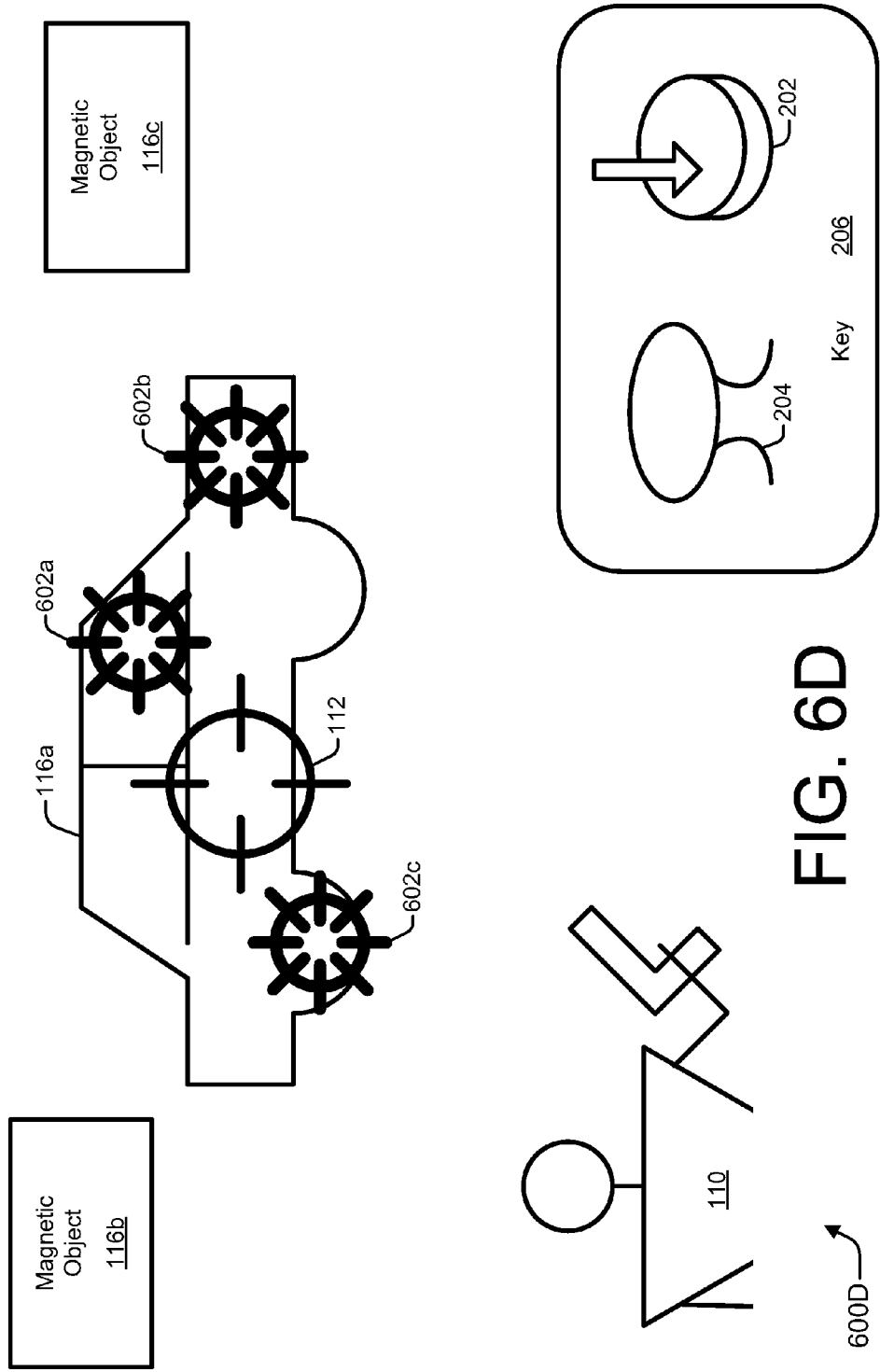

US 8,777,708 B2

TARGETING CONTROL IN A SIMULATED ENVIRONMENT

BACKGROUND

With the rapid increase in processing power, processing devices are capable of simulating complex environments. Environments are simulated for entertainment, educational, training, and other purposes. For any of these various purposes, some simulated environments are directed to simulating combat situations. Within simulated combat environments, users operate player characters. Player characters are often operated to defend self or others, to achieve a mission objective, or for other reasons.

In today's complex simulated environments, player characters are capable of interacting with many different simulated objects. Player characters are also empowered to interact with simulated objects in many different ways. This multitude of options contributes to the realism and richness of the simulated environments. On the other hand, the breadth and diversity of such options can also cause confusion and information overload for users who are operating the player characters. Unfortunately, existing user interface (UI) and controller input mechanisms fail to sufficiently ameliorate these problems that can overwhelm users and undercut the purposes of the simulated environment.

SUMMARY

Targeting control may be facilitated in a simulated environment. Fine aiming, target locking, and firing may be accomplished with one directional input and one button input. In an example embodiment, a method includes acts of monitoring, generating, moving, and firing. A button input and a directional input are monitored. If a press and hold of the button input is detected, a fine aiming mode is generated. If movement of the directional input is detected during the fine aiming mode, a location of a target indicator is moved responsive to the detected movement. When a release of the button input is detected, a ranged weapon is fired based on the location of the target indicator.

In other example embodiments, target locking is established with magnetic objects that "attract" a target indicator. When the target indicator is moved sufficiently proximate to a magnetic object, a target lock is established on the magnetic object. While the target lock is established, the location of the target indicator tracks a position of the magnetic object. In an example implementation, a target lock may be broken by a user by moving the directional input a predetermined distance (e.g., to a physically-maximum distance).

In still other example embodiments, target-locked subtargeting may be accomplished using one directional input and one button input or two button inputs. In an example one-button-input embodiment, a target-lock subtargeting mode is automatically activated some time after a target lock is established on a magnetic object. In an example two-button-input embodiment, a target-lock subtargeting mode is activated if a second, subtargeting button input is at least pressed by a user while a target lock is established. When a target-lock subtargeting mode is activated with a one or two button implementation, detected movement of the directional input causes a location of the target indicator to be moved to a subtargeted area of the magnetic object to which the target indicator is currently locked.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

FIGS. 4A-4D illustrate an example fine aiming mode with target lock for targeting control in a simulated environment.

FIGS. 6A-6E illustrate an example target-lock subtargeting mode using one button for targeting control in a simulated environment.

DETAILED DESCRIPTION

1: Introduction to Targeting Control in a Simulated Environment

Target locking enables a moving target to be tracked, for example, in an action game that utilizes ranged combat. Target locking may be combined with subtarget locking, which enables different areas of a targeted object to be targeted. Subtargeting can provide the feel of extra-fine aiming without demanding excessively delicate work from a player of the game. Unfortunately, conventional target locking interfaces are often complicated—they require using different buttons and/or a second directional input stick for switching between targets and subtargets. Conventional approaches are therefore a barrier to new players. Moreover, conventional approaches can rapidly consume gaming controller inputs and/or clutter a gaming controller.

An example conventional approach is described with reference to an existing game. In this existing game, a target locking system does allow a player character to move freely while locking onto a target upon a button press. More specifically, locking onto a target is achieved by pressing a left shoulder button on a gaming controller. Changing locked targets is achieved by using both shoulder buttons. Changing subtargeted areas of a target-locked object is achieved by moving a right stick of the gaming controller. Firing is achieved by pressing the right shoulder button. Aiming a target indicator when no target is currently locked is achieved by using the right stick.

The above-described conventional approach does enable target locking and subtargeting during the target locking. However, multiple buttons are required to be used in multiple different combinations. A limitation of this approach is thus the number of inputs required to aim, lock, change subtargets, and fire a player character's weapon. This can be difficult to learn and incessantly confusing, which reduces the enjoyment of the game. For other purposes of simulated environments, this conventional approach can reduce the effectiveness of the education, the training, and so forth.

In contrast, with certain example embodiments, a player is able to aim a ranged weapon, target lock, subtarget lock, and fire the ranged weapon using one directional input and one button input. In an example implementation, this is enabled by making the release of a ranged weapon button input the trigger that fires the ranged weapon. This allows the duration that the ranged weapon button input is held to define a length of a fine aiming mode. In the fine aiming mode, movement of the directional input aims the ranged weapon through a target indicator, instead of moving the player character within the simulated environment.

2: Example Embodiments for Targeting Control in a Simulated Environment

Figure 1:
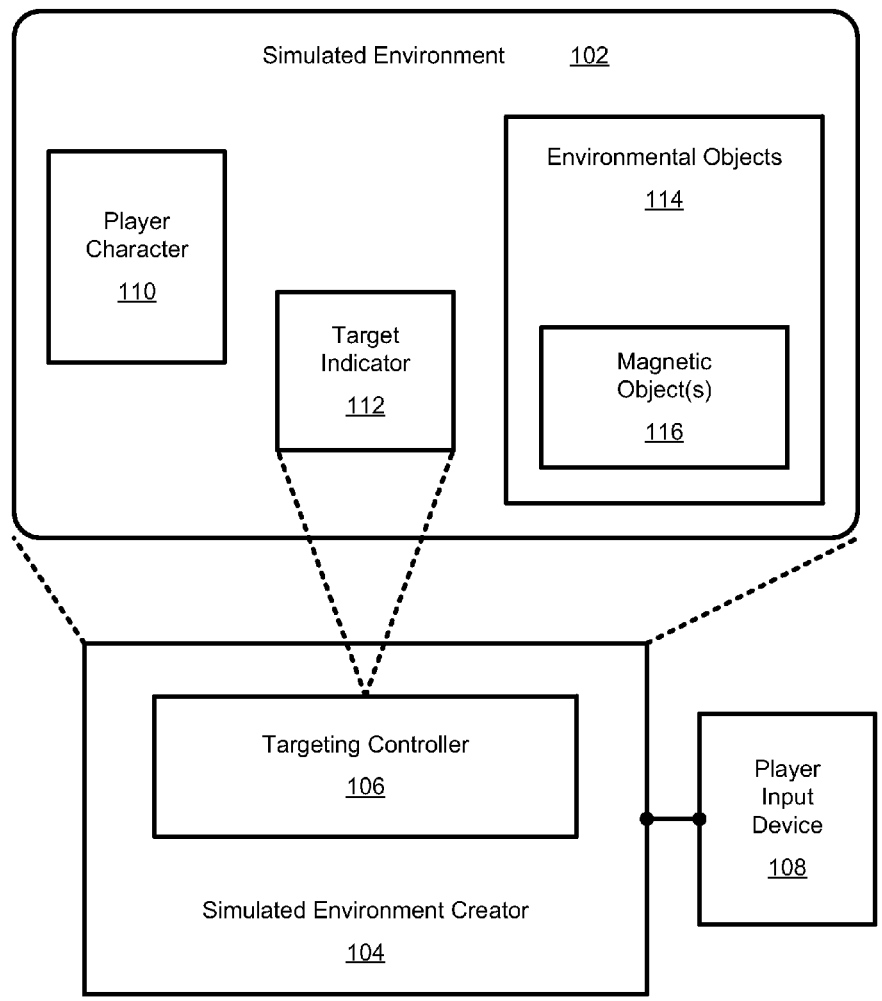
FIG. 1 is a block diagram illustrating an example simulated environment created by an example simulated environment creator, which includes a targeting controller and is coupled to a player input device, in which embodiments for targeting control in a simulated environment may be implemented.

FIG. 1 is a block diagram 100 illustrating an example simulated environment 102 created by an example simulated environment creator 104, which includes a targeting controller 106 and is coupled to a player input device 108, in which embodiments for targeting control in a simulated environment may be implemented. Thus, as illustrated, block diagram 100 includes simulated environment 102, simulated environment creator 104, and player input device 108. Simulated environment creator 104 includes targeting controller 106.

In an example embodiment, simulated environment 102 includes at least one player character 110, at least one target indicator 112, and one or more environmental objects 114. Environmental objects 114 include one or more magnetic objects 116. Simulated environment 102 may be any real or imagined environment that is capable of being simulated by a processing device. Example environments include, but are not limited to, buildings, towns, valleys, jungles, desserts, air, planets, space, and other potential combat environments.

A player character 110 represents a user/player in simulated environment 102. Player character 110 may be a humanoid, a vehicle, a ship, some combination thereof, and so forth. Player character 110 may be depicted fully, partially, or implicitly within simulated environment 102 in any manner. The depiction may depend on the type of environment and/or character, the type of simulation, the current camera angle, and so forth. For example, a significant portion of player character 110 is usually depicted with a third person camera angle while little to none of player character 110 may be depicted with a first person camera angle.

Multiple environmental objects 114 may be depicted in simulated environment 102 at any given moment. Environmental objects 114 may be, by way of example but not limitation, stationary objects, moving objects, and so forth. Some environmental objects 114 may be capable of being directly interacted with by the user with player character 110. One type of environmental objects 114 that is capable of being interacted with is magnetic objects 116.

A magnetic object 116 is attractive to target indicator 112, at least during a fine aiming mode. When a target indicator 112 is sufficiently proximate to a magnetic object 116 during a fine aiming mode, target indicator 112 "snaps" onto the proximate magnetic object 116. Operation of target indicator 112 is under the control of targeting controller 106 responsive to inputs by a user. A user may provide input to simulated environment 102 using player input device 108. Examples of a player input device 108 are described herein below with particular reference to FIG. 2.

In an example operation, simulated environment creator 104 is to create simulated environment 102. Targeting controller 106 is to produce and present target indicator 112 in response to user input(s). Generally, embodiments of targeting controller 106 may perform the different targeting control functionality that is described herein. Simulated environment creator 104, and hence targeting controller 106, may be realized as processor-executable instructions (e.g., a program, an application, a module, coding, etc.) that are executable on a processing device. Example processing devices and processor-executable instructions located on and/or realizes as part of processor-accessible media are described herein below with particular reference to FIG. 11.

During an example operation, a user may manipulate target indicator 112 with player input device 108. When a range weapon button input is pressed and held, a fine aiming mode is generated (and entered). In response, targeting controller 106 produces target indicator 112 and presents it within simulated environment 102. When a directional input is moved, target indicator 112 is moved around simulated environment 102 in response to the movements of the directional input.

During the movement of target indicator 112, it may snap onto a magnetic object 116 if it is moved by the user so as to be sufficiently proximate to a magnetic object 116. A level of closeness that qualifies as sufficiently proximate may be set by simulated environment creator 104 based on any of a number of factors. Example factors include, but are not limited to: (i) a size of the visible portion of simulated environment 102, a size of target indicator 112, a size of magnetic objects 116, etc.; (ii) the desired difficulty of playing within simulated environment 102; (iii) the speed at which target indicator 112 is moved; (iv) a combination thereof; (v) and so forth. The proximity setting for snapping target indicator 112 to a magnetic object 116 may be adjusted over time for a given player character 110 and/or for different player characters 110. It should be noted that the proximity setting may be set to entail actual contact by target indicator 112 with magnetic object 116 and/or contact with a specific area or portion of magnetic object 116.

The snapping of target indicator 112 to a magnetic object 116 establishes a target lock. With the target lock, target indicator 112 will track the position(s) of a magnetic object 116 as it moves around simulated environment 102, at least so long as it remains within view of player character 110. During the target lock, a target-lock subtargeting mode may be activated. The target-lock subtargeting mode facilitates movement of target indicator 112 to subtargeted areas of the magnetic object 116 to which target indicator 112 is currently locked. One and two button example embodiments for a target-lock subtargeting mode are described herein below with particular reference to FIGS. 6A-7 and 8A-9, respectively. During the fine aiming mode that is entered when the ranged weapon button input is pressed and held, release of the ranged weapon button causes a ranged weapon to fire.

Example embodiments for the fine aiming mode are described herein below with particular reference to FIGS. 4A-5.

Figure 2:
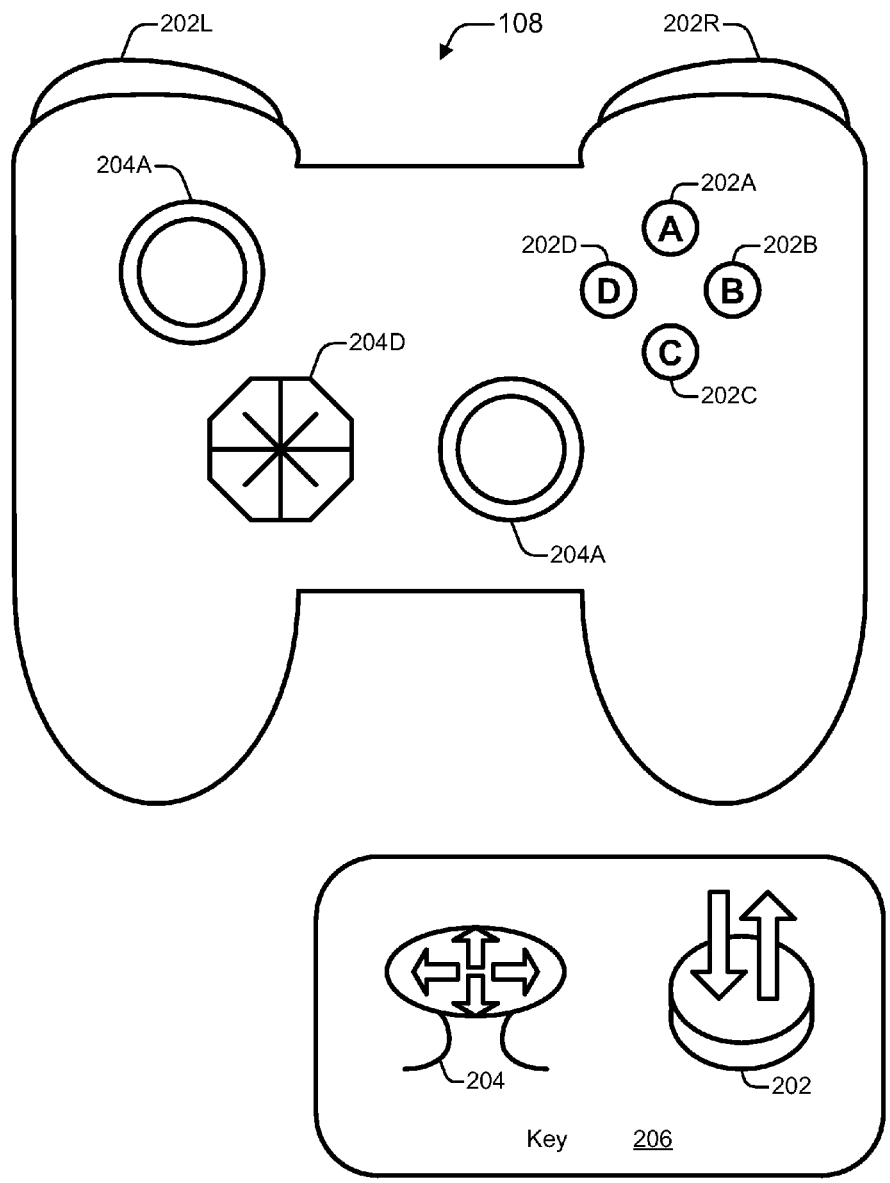
FIG. 2 illustrates an example player input device including a directional input and a button input.

FIG. 2 illustrates an example player input device 108 including at least one directional input 204 and at least one button input 202. As illustrated, player input device 108 includes three directional inputs 204 and six button inputs 202. The three directional inputs 204 include two analog directional inputs 204A and one digital directional input 204D. The six button inputs 202 include four "top-mounted" button inputs 202A, 202B, 202C, and 202D and two "shoulder-mounted" button inputs 202L and 202R. Button input 202L is a left shoulder button, and button input 202R is a right shoulder button. However, a player input device 108 may have different numbers, types, and configurations of button inputs 202 and directional inputs 204.

Typically, an analog directional input 204A (e.g., a control stick, a joystick, etc.) is capable of detecting a range of movement along a multitude of directions. In contrast, a digital directional input 204D (e.g., a plus pad, a joypad, etc.) is capable of detecting binary (on/off) movement along a finite number of directions. The finite number of directions is often four or eight, but it may be a different number of directions. Some embodiments that are described herein may be operated with either a digital or an analog directional input 204D or 204A. Other embodiments, which are identified herein below, are operated using analog aspects of an analog directional input 204A.

For example embodiments, a key 206 shows a directional input 204 and a button input 202. Directional input 204 may be moved in a number of different directions as represented by the four arrows (that are arranged in a plus shape in FIG. 2). Although four arrows are shown for directional input 204 in key 206 of FIG. 2, a given directional input 204 may be capable of receiving input in a different number of directions, especially if it is an analog directional input 204A. Button input 202 may be pressed, held, and/or released (e.g., pressed and released or pressed and held and subsequently released). A downward arrow indicates a press. It also indicates that the button input is continued to be pressed (i.e., held) until an upward arrow indicates that the button input is being released. This key 206 is used to further describe and illustrate various embodiments in FIGS. 3, 4A-4D, 6A-6E, and 8A-8C.

As shown in FIG. 2, a player input device 108 may be realized as a gaming-type controller. However, player input device 108 may be realized using different input device(s) that individually or together provide at least one directional input 204 and one or more button inputs 202.

Figure 3:
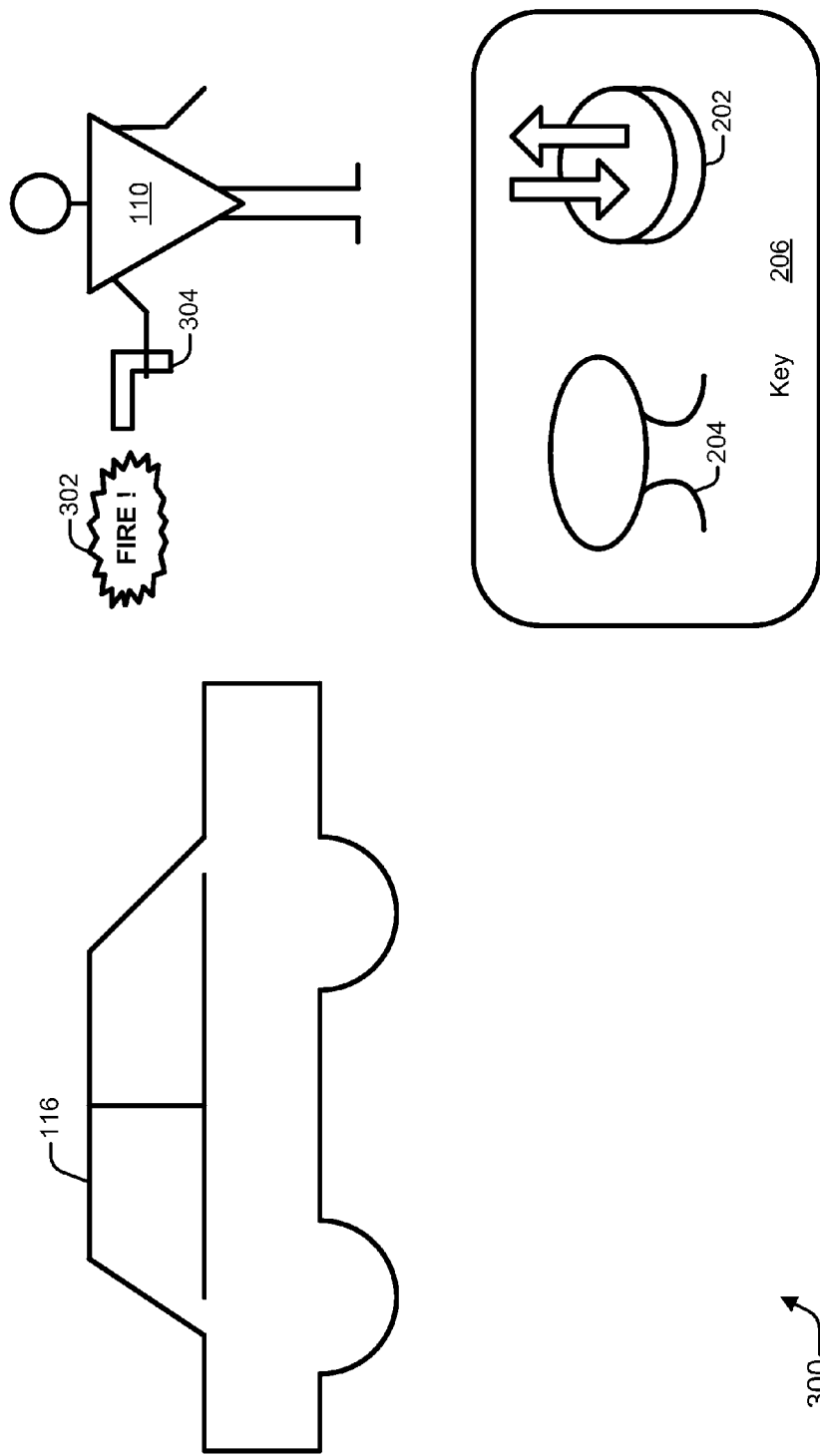
FIG. 3 illustrates an example standard firing procedure.

FIG. 3 illustrates an example standard firing procedure 300. As shown, standard firing procedure 300 includes a magnetic object 116, a player character 110, and a weapon 304. Although weapon 304 is illustrated as a handgun in standard firing procedure 300 and other FIGS. of the drawings, weapons for targeting control in a simulated environment may be any ranged weapon. Examples of ranged weapons include, but are not limited to: spears, slings, catapults, crossbows, rifles, bombs, laser/ray guns, rail guns, missiles, combinations and derivatives thereof, and so forth.

Although magnetic object 116 is illustrated as a vehicle in FIG. 3 and in the other FIGS. of the drawings, it is not so limited. In fact, magnetic objects 116 may generally be any environmental object 114. Examples of magnetic objects 116 include, but are not limited to: vehicles (e.g., cars, planes, submarines, spaceships, tanks, etc.), humanoids (e.g., individuals, groups, armor, etc.), enemy weapons, barriers/defenses, walls, buildings, cities, planets, combinations and derivatives thereof, and so forth.

In an example embodiment of standard firing procedure 300, a fine aiming mode is not generated. A user may move and orient player character 110 as desired, such as by using directional input 204. When button input 202 is pressed and released (e.g., as shown in key 206 in FIG. 3), weapon 304 of player character 110 is fired 302 from the current location and based on the orientation of player character 110 and possibly weapon 304. It should be noted that FIG. 3 is shown from a "normal" operational mode with a traditional so-called third person string and cage camera.

Thus, in an example implementation, the ranged weapon button input fires the weapon on its release, instead of its press. With these quick shots, tapping the ranged weapon button does not change the camera. However, the camera may observe any direction inputted via the directional input so as to cause it to turn and face the player character and fire the weapon in that direction. If no direction is inputted, the current direction that the player character is facing is used to fire the weapon.

Figure 4A:
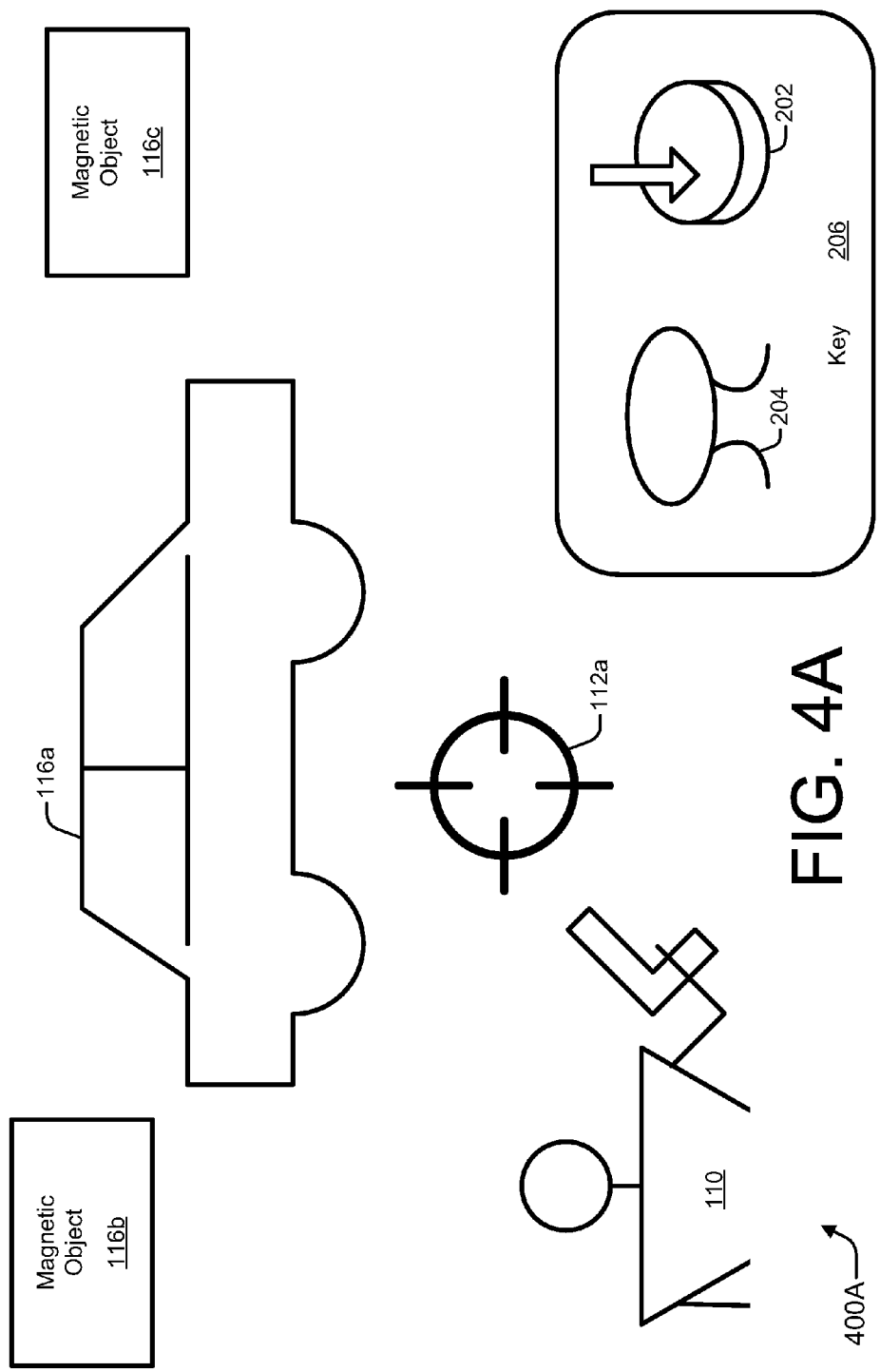
Figure 4B:
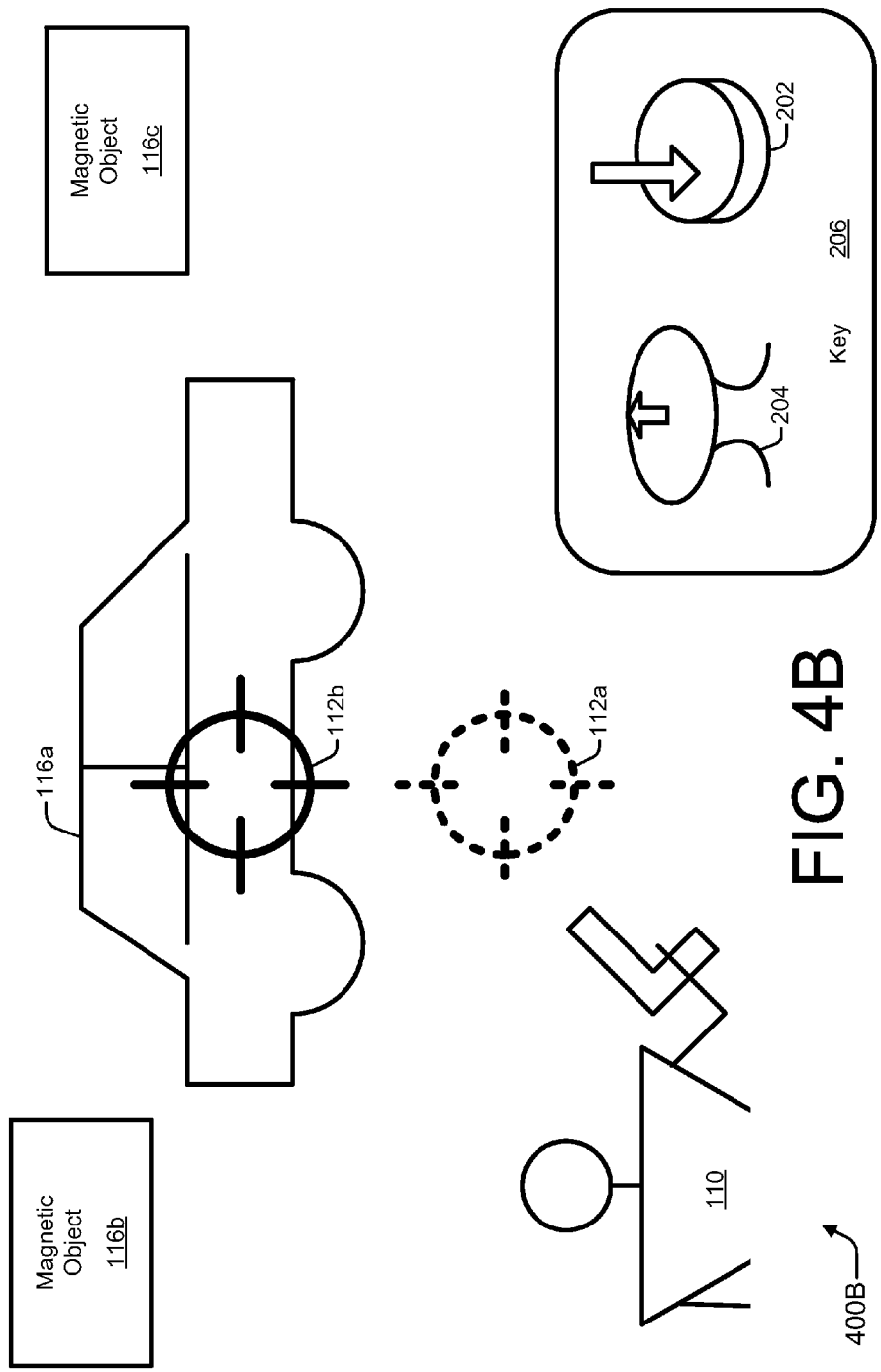
Figure 4D:
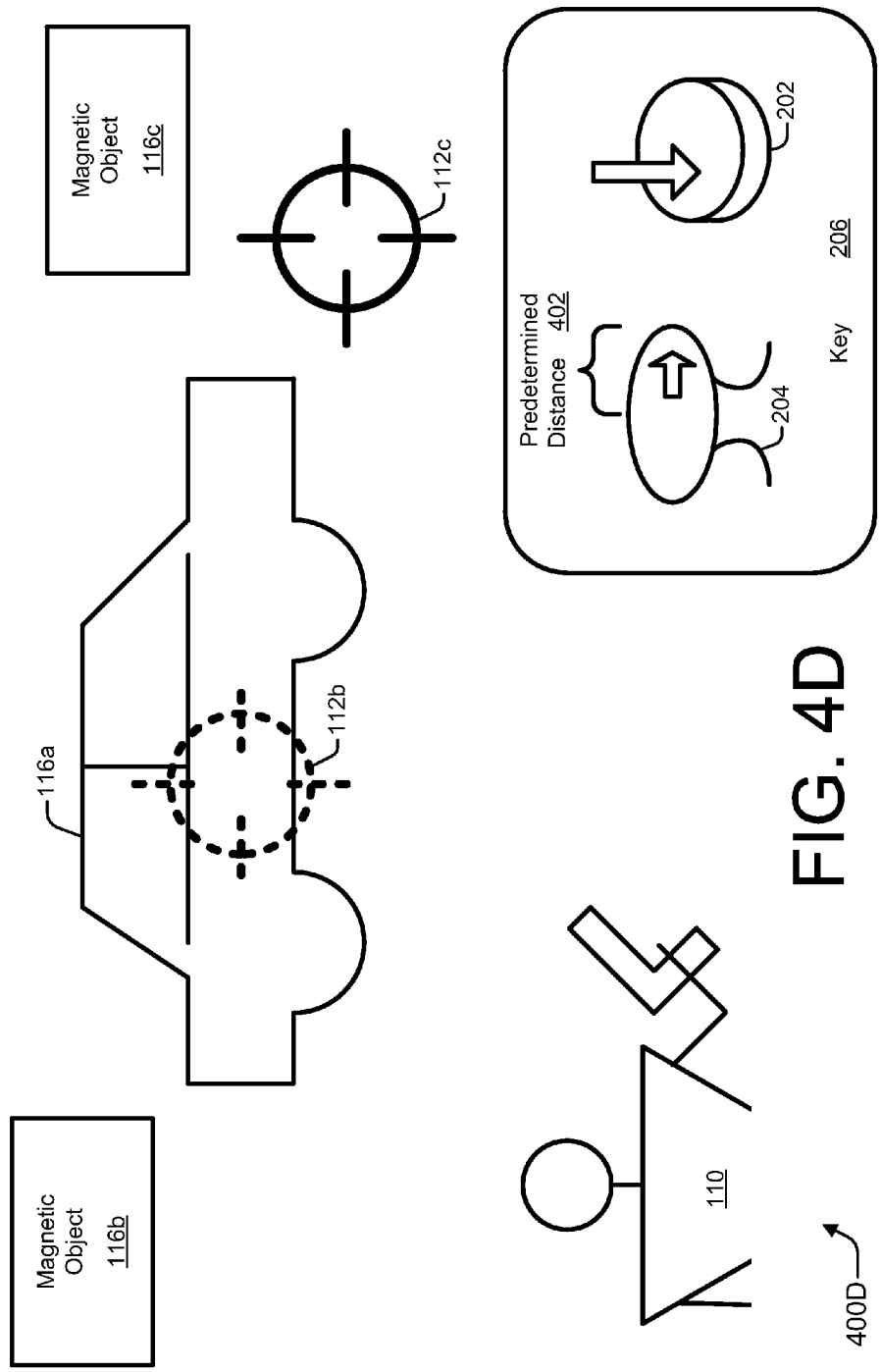

FIGS. 4A-4D illustrate an example fine aiming mode with target lock for targeting control in a simulated environment. FIG. 4A shows an example entry into a fine aiming mode when it is generated. FIG. 4B shows an example snapping of a target indicator 112 to a magnetic object to establish a target lock. FIG. 4C shows an example firing at the magnetic object to which target indicator 112 is locked. FIG. 4D shows an example breaking of a target lock. Example embodiments for a fine aiming mode are described in greater detail below with references to FIGS. 4A-4D.

With reference to FIG. 4A, illustrated generally at 400A are three magnetic objects 116a, 116b, and 116c. As indicated by key 206, a user presses and holds button input 202. Responsive to detecting the pressing and holding of button input 202, a fine aiming mode is generated. Movement of player character 110 may be curtailed during the fine aiming mode. A target indicator 112a is produced and presented with the simulated environment. These actions may be performed by, for example, targeting controller 106 (of FIG. 1). Although target indicator 112 is shown in the accompanied drawings as a targeting reticule, target indicator 112 may be drawn and displayed in alternative manners.

When entering the fine aiming mode, the camera angle is switched to a view that is conducive to aiming a weapon from the vantage point of player character 110. Example appropriate camera angle vantage points that are conducive to aiming a weapon are first person, third person over-the-shoulder, combinations and derivatives thereof, and so forth. With a first person view, a part of player character 110 (e.g., a weapon and an arm portion, a turret, etc.) may be displayed. An example third person over-the-shoulder view is illustrated in FIG. 4A and the other drawings. The fine aiming mode view may consume all or merely a portion of the available screen, pane, or window real estate that is displaying simulated environment 102 (of FIG. 1).

With reference to FIG. 4B, as illustrated generally at 400B, target indicator 112 may be moved during the fine aiming mode. As shown at key 206, the user continues to hold button input 202 to maintain the fine aiming mode. Additionally, the user moves directional input 204. In this example, directional input 204 is moved upward. In responsive to detecting this upward movement of directional input 204, target indicator 112 is moved upward. More specifically, target indicator 112a is moved from one location to a new location at target indicator 112b. The speed of this movement may be proportional to the distance that an analog directional input 204A is moved. The dotted lines of target indicator 112a indicate a location from which target indicator 112 is being moved.

Because the depicted vehicle is a magnetic object 116a, target indicator 112 snaps onto it when the location of target indicator 112 becomes sufficiently proximate. In other words, when targeting controller 106 detects that a location of target indicator 112 is sufficiently close to a magnetic object 116 so that it attracts target indicator 112, targeting controller 106 snaps target indicator 112 onto the magnetic object 116. This establishes a target lock on magnetic object 116a. Thus, for example implementations in which environmental objects 114 include magnetic objects 116, the user may not be forced to carefully maneuver target indicator 112 precisely onto magnetic object 116a (depending on the proximity setting for snapping a target lock onto a magnetic object).

With reference to FIG. 4C, as illustrated generally at 400C, a weapon may be fired during and/or at the conclusion of a fine aiming mode. As shown at key 206, the user releases button input 202. When release of button input 202 is detected, the ranged weapon that player character 110 is currently using is fired 302. The weapon is fired based on the current location of target indicator 112b. Hence, barring other external environmental factors and/or defensive capabilities of magnetic object 116a, player character 110 is likely to successfully hit the target-locked magnetic object 116a. Release of button input 202 may also terminate the fine aiming mode.

With reference to FIG. 4D, as illustrated generally at 400D, a target lock may be broken using directional input 204. FIG. 4D is particularly applicable to embodiments in which directional input 204 is an analog directional input (e.g., including one-button target lock subtargeting mode embodiments). As shown at key 206, fine aiming mode is maintained as the user continues to hold button input 202. A target lock has been established on magnetic object 116a as indicated by the location of target indicator 112b. This situation corresponds to the end of the events depicted in FIG. 4B.

To break the target lock, a user moves directional input 204 a predetermined distance 402. When targeting controller 106 detects movement of directional input 204 the predetermined distance 402, it is apparent that the user wishes to break the target lock, so the target lock is relinquished. Relinquishing the target lock causes the location of target indicator 112 to be moved away from the currently-targeted magnetic object 116a. As shown, target indicator 112b moves to target indicator 112c responsive to detection of movement of directional input 204 the predetermined distance 402. These aspects are further described herein below with particular reference to FIG. 7.

When a target lock is relinquished, target indicator 112 may be moved in the direction of the movement of the directional input 204 that caused the target lock to be broken. Until a target lock is broken by movement of directional input 204 the predetermined distance 402, movements that are less than the predetermined distance 402 enable a user to move target indicator 112 around the currently-locked magnetic object 116a to subtargeted areas. This is described further herein below with particular reference to FIGS. 6A-6E and 7.

In an example embodiment, the predetermined distance 402 is a maximally-permissible physical amount of movement for an analog directional input 204A. In such an embodiment, a user may conveniently thrust the knob, stick, etc. of an analog directional input 204A as far as the housing will permit (e.g., against a plastic side) in order to break the target lock.

Figure 5:
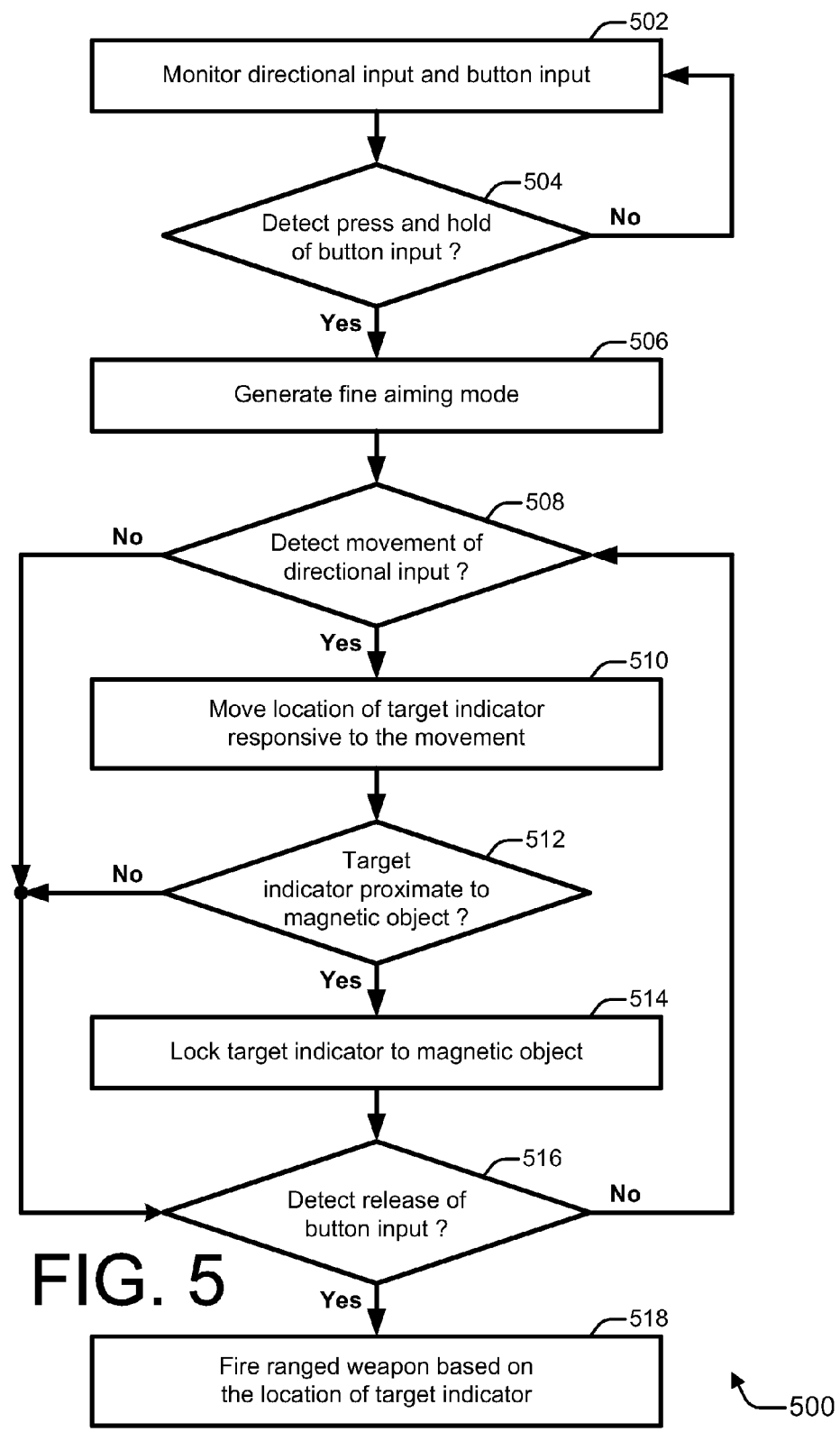
FIG. 5 is a flow diagram that illustrates an example of a method for implementing a fine aiming mode with target lock for targeting control in a simulated environment.

FIG. 5 is a flow diagram 500 that illustrates an example of a method for implementing a fine aiming mode with a target lock for targeting control in a simulated environment. Flow diagram 500 includes nine blocks 502-518. Implementations of flow diagram 500 may be realized, for example, as processor-executable instructions and/or by a targeting controller 106 (of FIG. 1).

Figure 11:
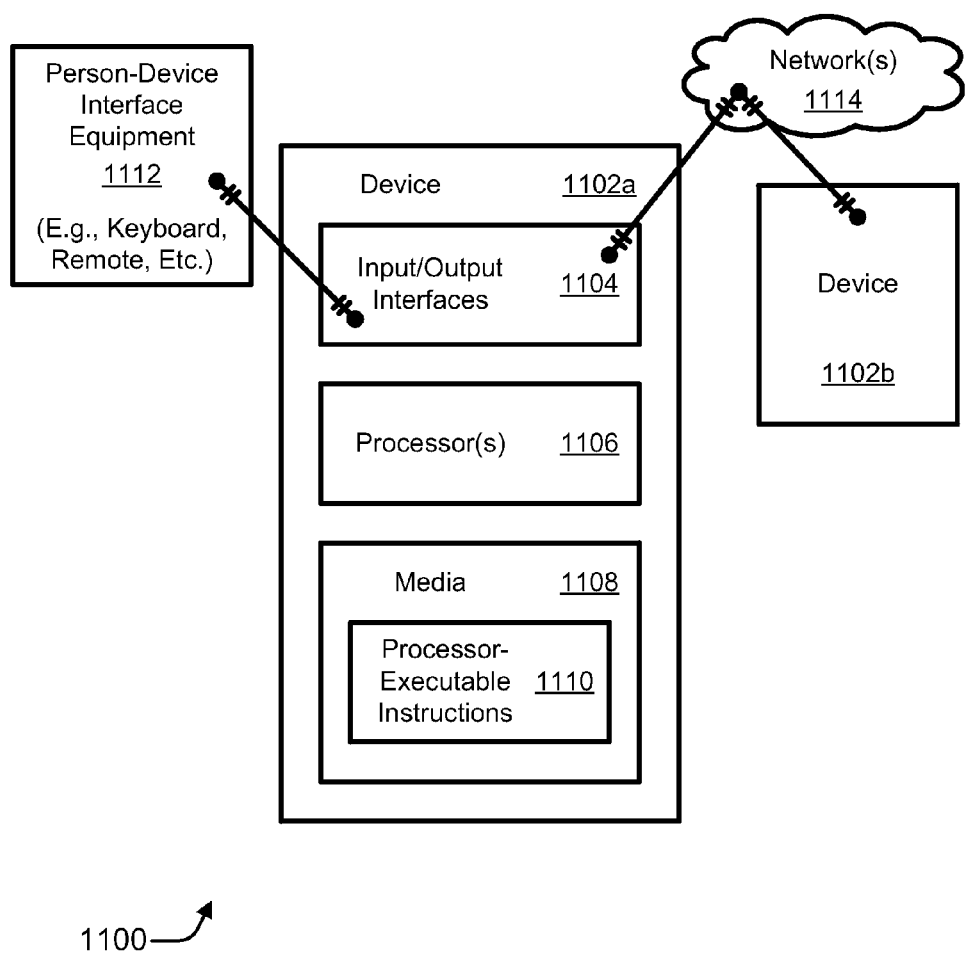
FIG. 11 is a block diagram illustrating example devices that may be used to implement embodiments for targeting control in a simulated environment.

It should be noted that the acts of the various flow diagrams that are described herein may be performed in many different environments and with a variety of different devices, such as by one or more processing devices (e.g., of FIG. 11). The orders in which the methods are described are not intended to be construed as a limitation, and any number of the described blocks can be combined, augmented, rearranged, and/or omitted to implement a respective method, or an alternative method that is equivalent thereto. Although specific elements of certain other FIGS. are referenced in the description of the flow diagrams, the methods may be performed with alternative elements.

For certain example embodiments, starting at block 502, a directional input and a button input are monitored. They may be monitored together, separately, sequentially, simultaneously, or some combination thereof. At block 504, it is detected if the button input has been pressed and held. If not, the method continues at block 502 with continued monitoring. If the button input is detected to have been pressed and held, then at block 506 a fine aiming mode is generated.

At block 508, it is detected if there is movement of the directional input. If not, the method continues at block 516. If movement of the directional input is detected, then at block 510 a location of the target indicator is moved responsive to the movement of the directional input. At block 512, it is determined if the location of the target indicator is proximate to a magnetic object. If not, the method continues at block 516.

If, on the other hand, the location of the target indicator is determined (at block 512) to be sufficiently close to a magnetic object, then at block 514 the target indicator is locked onto the magnetic object. This locking establishes a target lock on the magnetic object. Consequently, as the magnetic object changes position within the simulated environment 102, the target indicator tracks the position of the magnetic object, at least while a view of the magnetic object remains unblocked/uninterrupted (from the perspective of the player character).

At block 516, it is detected if the button input has been released. If not, then the method continues at block 508 to attempt to detect movement of the directional input. If the button input is detected (at block 516) to be released, then at block 518 a ranged weapon is fired based on the current location of the target indicator. Detection of this release of the button input may also terminate the fine aiming mode.

Figure 6A:
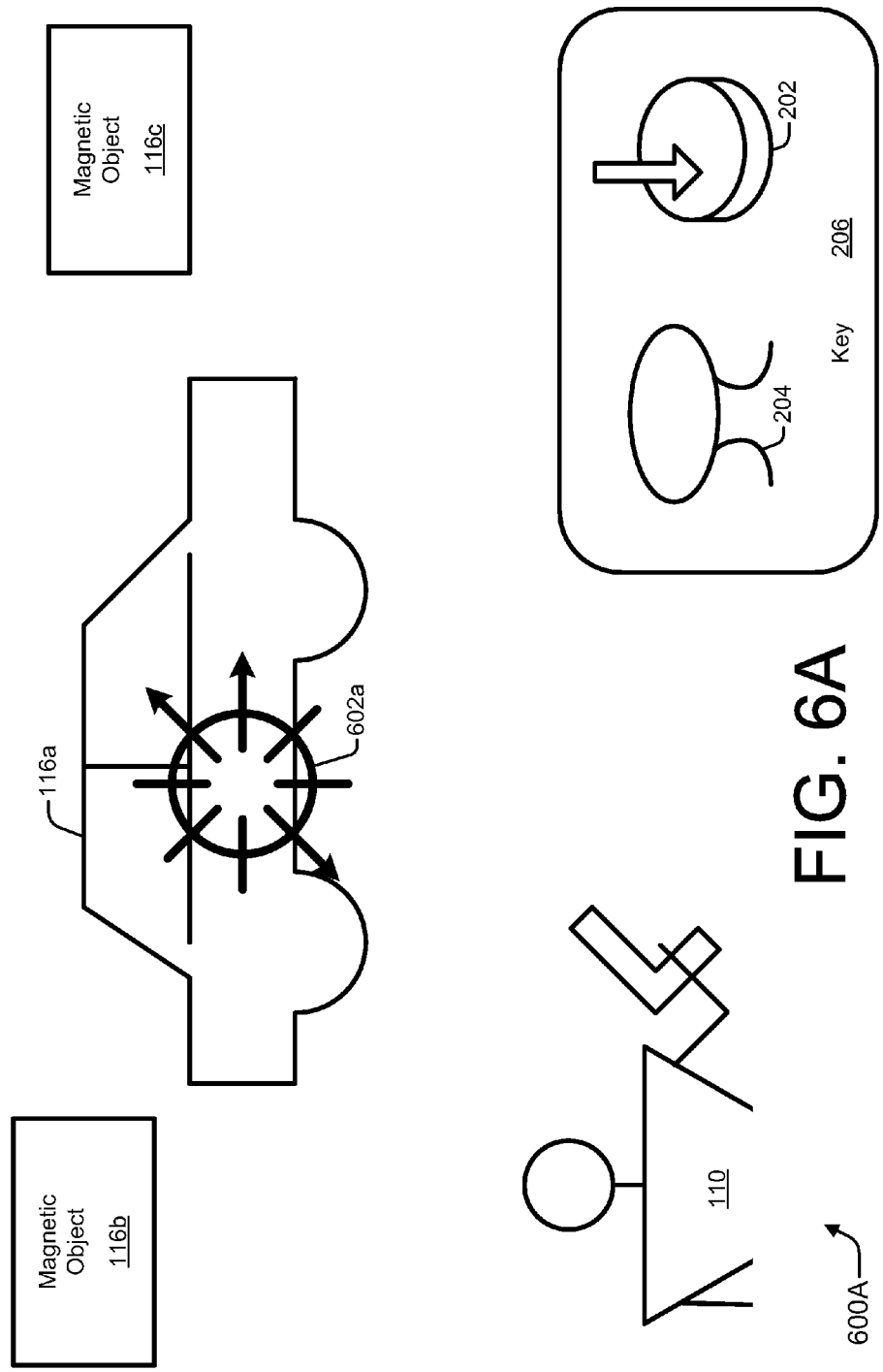
Figure 6B:
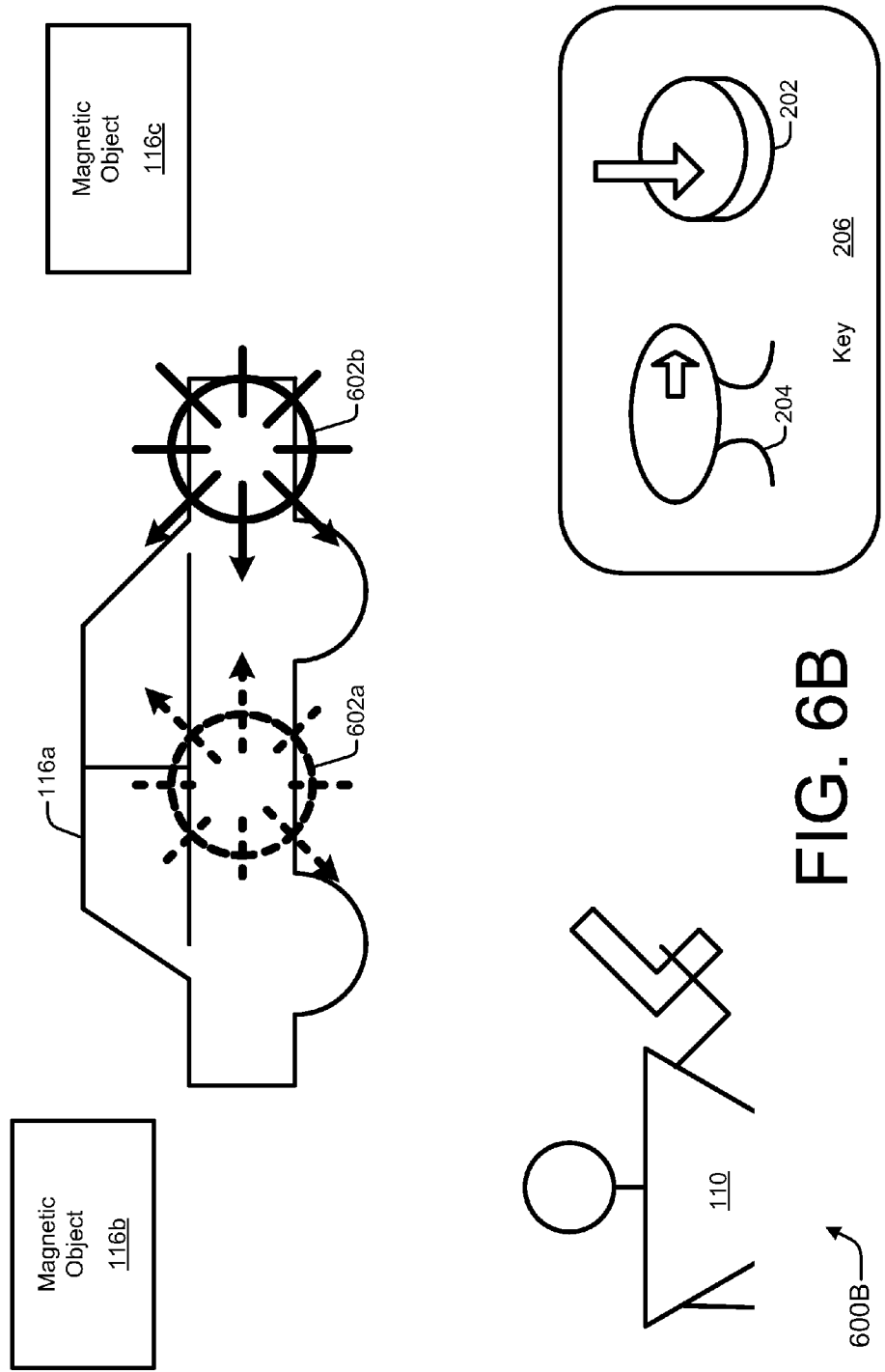
Figure 6C:
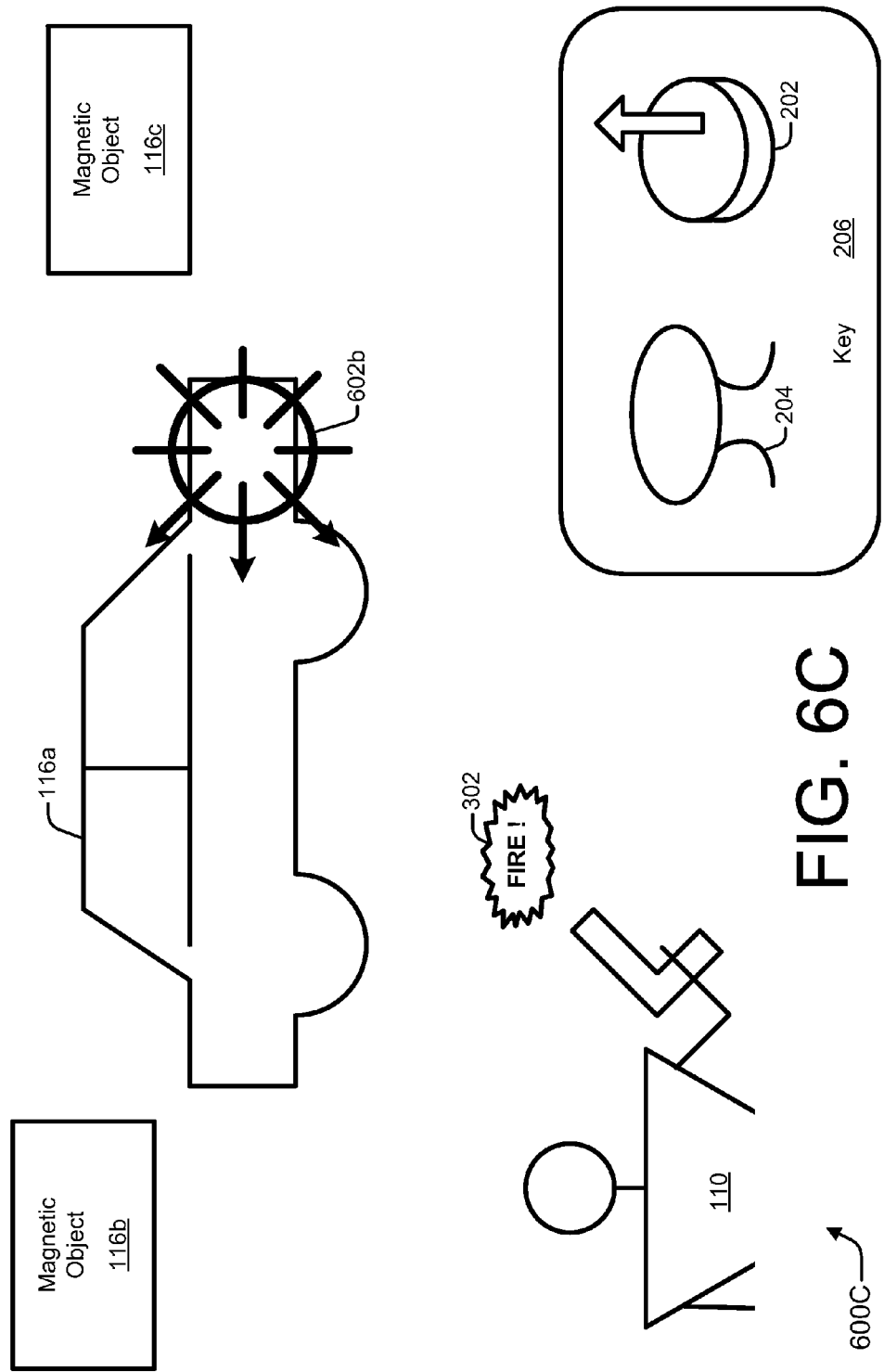
Figure 6E:
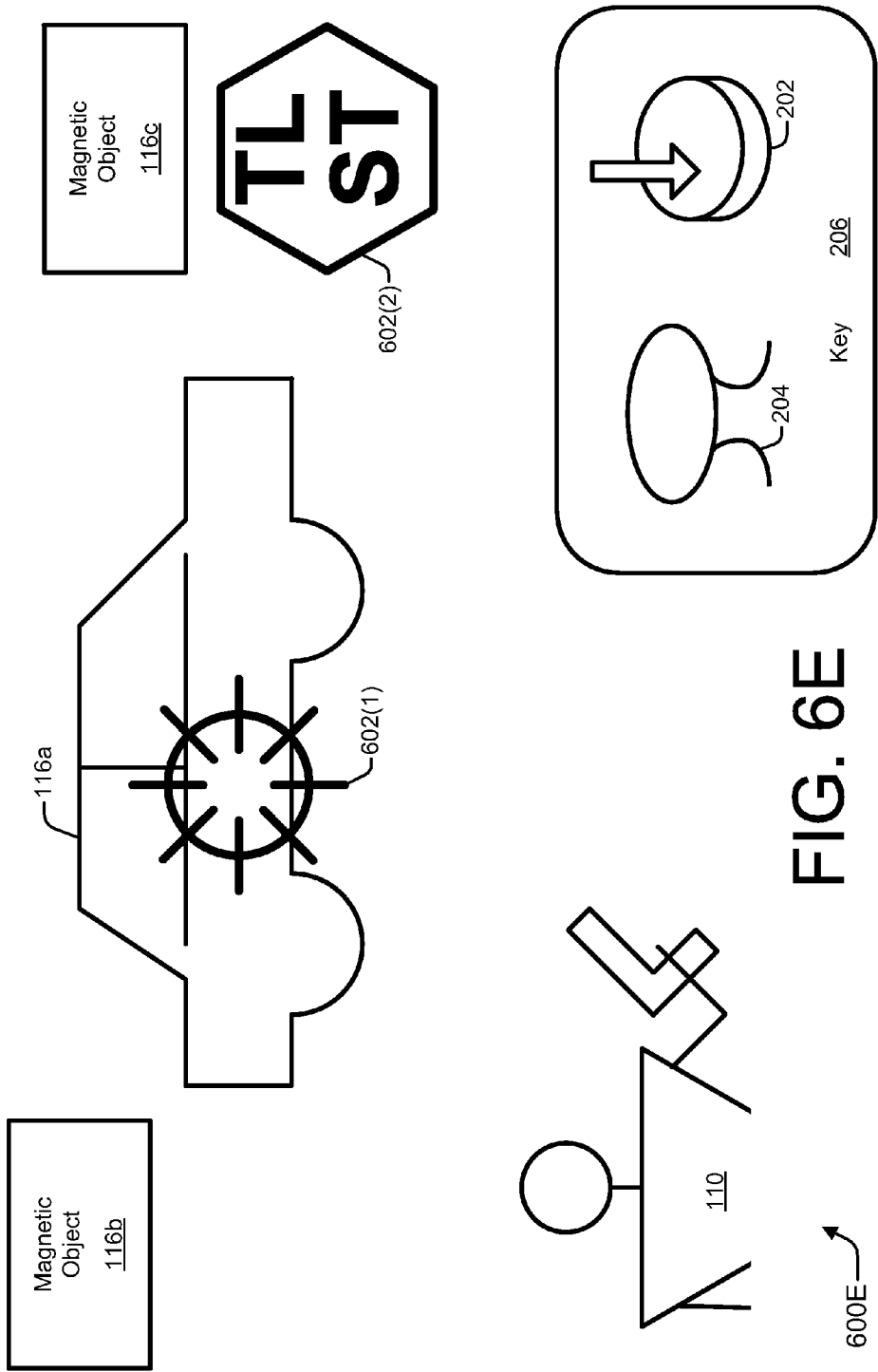

FIGS. 6A-6E illustrate an example target-lock subtargeting mode using one button for targeting control in a simulated environment. FIGS. 6A-6C jointly illustrate an example operational embodiment. FIGS. 6D and 6E illustrate alternative embodiments, especially for UI implementations. For these example embodiments, a user may operate the target-lock subtargeting mode with one button input 202 and one directional input 204.

With reference to FIG. 6A, as illustrated generally at 600A, a target-lock subtargeting mode has been activated. As shown by key 206, a user continues to hold button input 202. A target lock has been established on magnetic object 116a. After a predetermined period of time elapses once a target lock is established, targeting controller 106 automatically activates a target-lock subtargeting mode in this embodiment. This predetermined period of time may be zero seconds or longer (e.g., a few tenths of a second).

Activation of the target-lock subtargeting mode is indicated by some UI element. In FIG. 6A, activation of the target-lock subtargeting mode is indicated by having target indicator 112 (not shown in FIG. 6A) change its appearance as (sub) target indicator 602a. Alternative UI indications to reveal the activating of a target-lock subtargeting mode may be implemented; example alternatives are described herein below with particular reference to FIGS. 6D and 6E. In FIG. 6A, target indicator 602a has eight crosshairs instead of four to indicate that the target-lock subtargeting mode has been activated.

In an example embodiment as illustrated at 600A, target indicator 602a further indicates subtargeting area options that are available on magnetic object 116a, which is the magnetic object 116 to which the target indicator 602a is currently locked. Three of the crosshairs have arrows pointing to subtargeting areas. For instance, as shown, the three subtargeting area options of the vehicle are: the front seat, the engine, and the rear tire. When magnetic object 116 is a humanoid, for instance, predefined subtargeting area options may be, for example: a head, a right hand/weapon, a left hand/weapon, and one or both legs, with the torso being a default target-lock area.

With reference to FIG. 6B, as illustrated generally at 600B, target indicator 602 is being moved to a subtargeting area. As shown by key 206, a user continues to hold button input 202 and moves directional input 204 to the right. Responsive to detection of this movement of directional input 204, the subtargeting area to the right of target indicator 602a is selected. Specifically, target indicator 602a is moved to target indicator 602b. The front seat subtargeting area could have been selected instead by moving directional input 204 at an angle upwards and to the right.

With reference to FIG. 6C, as illustrated generally at 600C, the subtargeting area corresponding to the engine of the vehicle is being targeted by the location of target indicator 602b. As shown by key 206, a user releases button input 202. Responsive to detection of the release of button input 202, the weapon of player character 110 is fired 302. The firing is performed based on the current location of target indicator 602b.

In embodiments in which target indicator 602 further indicates other available subtargeting areas, the arrows of target indicator 602b are updated to reflect the currently-available subtargeting areas after movement to the location of target indicator 602b. More specifically, three arrows point to the following subtargeting areas: leftward and upward toward the front seat, leftward toward the middle of the car (e.g., toward the original default target-locking area), and leftward and downward toward the rear tire. If the user were not to release button input 202, additional movements of directional input 204 may relocate target indicator 602 to a different subtargeting area.

With reference to FIG. 6D, as illustrated generally at 600D, a different GUI indicator reveals that a target-lock subtargeting mode has been activated. As shown by key 206, a user continues to hold button input 202. A target lock is still maintained by target indicator 112 on magnetic object 116a. Three target indicators 602 are presented to reveal activation of the target-lock subtargeting mode.

The location(s) of these additional subtargeting target indicators 602 indicate the subtargeting area options on magnetic object 116a that are available to player character 110. As shown, target indicator 602a corresponds to the front seat of the vehicle, target indicator 602b corresponds to the engine, and target indicator 602c corresponds to the rear wheel. An additional movement of directional input 204 by the user can cause any of these three subtargeting areas to be targeted by the target lock (e.g., by moving target indicator 112).

With reference to FIG. 6E, as illustrated generally at 600E, other alternative GUI indicator(s) are presented to reveal activation of the target-lock subtargeting mode. As shown by key 206, a user continues to hold button input 202. A target lock is still maintained on magnetic object 116a. Two different example target indicators 602(1) and 602(2) are presented to reveal activation of a target-lock subtargeting mode. Either or both may be implemented in a given embodiment. Moreover, an audible indication may be implemented in addition to or instead of the target-lock subtargeting mode visual UI indicators shown in the drawings.

Target indicator 602(1) is similar to target indicator 602a (of FIG. 6A). Target indicator 112 is modified to create target indicator 602(1). In the illustrated example, the number of cross hairs has changed from four to eight to indicate that the target-lock subtargeting mode has been activated. Alternatively, a separate UI element may be overlaid on top of the displayed simulated environment 102. For example, a UI element 602(2) may be presented near the side of a screen, pane, window, etc. to reveal that a target-lock subtargeting mode has been activated. Although UI element 602(2) is shown as a hexagon containing four letters (e.g., "TL ST"), such a subtargeting indicator 602(2) UI element may be presented with a different appearance (including with or without letters).

In the example embodiments of target indicators 602(1) and 602(2), available subtargeting areas of magnetic object 116a are not specifically identified in the display. In one example implementation, a predefined set of subtargeting area options are implicitly available. These may vary by type of magnetic object 116 or be standard across a number of object types. For instance, these predefined areas may be up, down, left, and right available directions for subtargeting movement. These predefined directions and/or locations may be communicated to the user through instruction and/or experimentation.

In another example implementation, the subtargeting areas that are available to player character 110 provide a free range over all or a part of the magnetic object 116 on which a target lock is currently established. This provides a user an extra fine control during the target-lock subtargeting mode. A number of different example embodiments and multiple various implementations are described herein for a target-lock subtargeting mode with reference to FIGS. 6A-6E and 7. The different embodiments and implementations may be used together or separately as well as combined in a myriad of different ways. For example, a subtargeting mode target indicator 602(1) may appear relatively rapidly after a target lock is established and then be followed sometime thereafter by (sub) target indicators 602a,b,c (of FIG. 6D) if a user does not provide another input in the interim.

Figure 7:
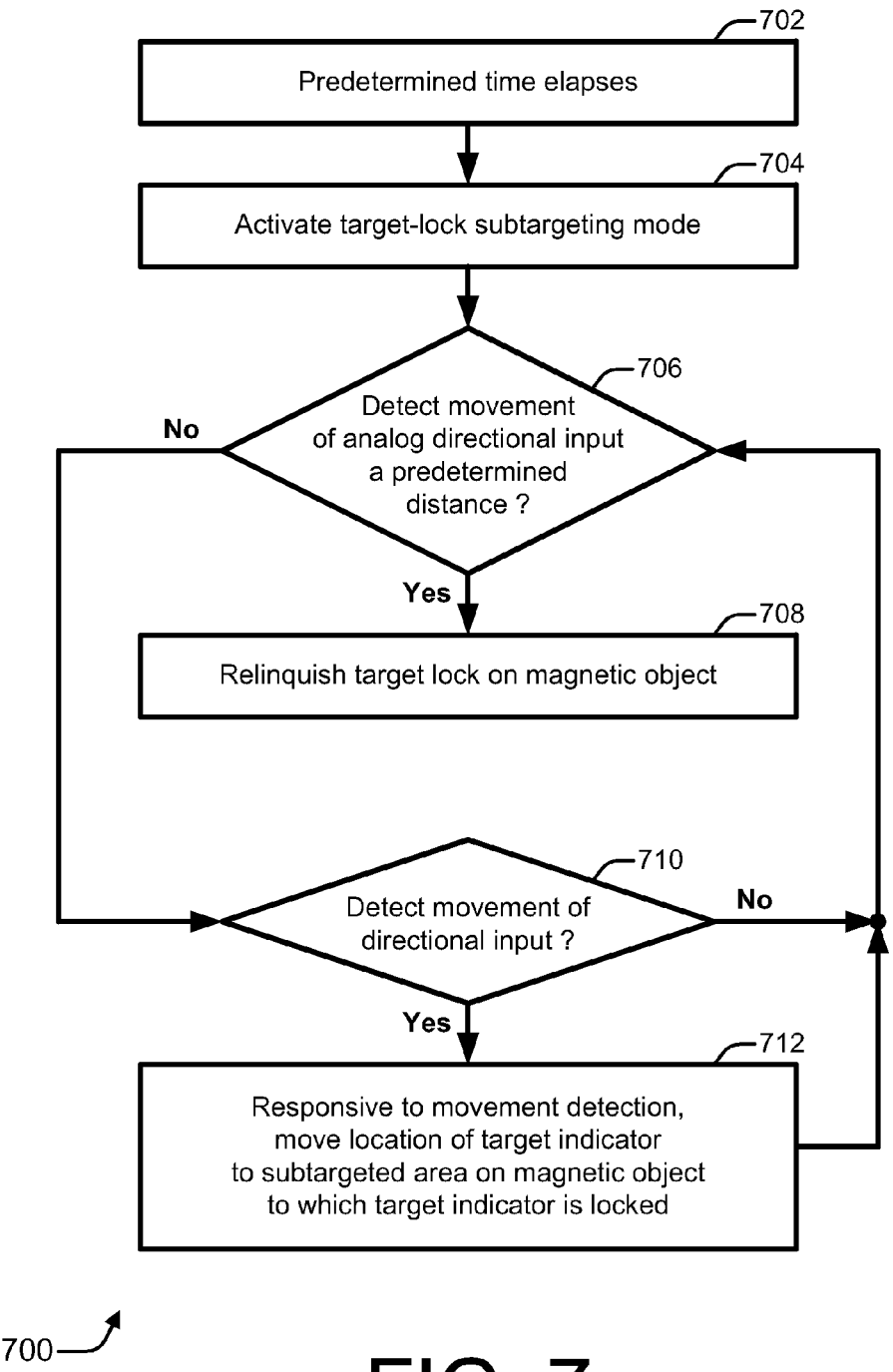
FIG. 7 is a flow diagram that illustrates an example of a method for implementing a target-lock subtargeting mode using one button for targeting control in a simulated environment.

FIG. 7 is a flow diagram 700 that illustrates an example of a method for implementing a target-lock subtargeting mode using one button for targeting control in a simulated environment. Flow diagram 700 includes six blocks 702-712. Implementations of flow diagram 700 may be realized, for example, as processor-executable instructions and/or by a targeting controller 106 (of FIG. 1). Flow diagram 700 is directed to scenarios in which a target lock has been established on a magnetic object. It is also directed to example embodiments in which an analog directional input can be used to break a target lock.

For certain example embodiments, starting at block 702, a predetermined time period elapses after a target lock has been established on a magnetic object. The predetermined time period may be zero seconds or longer. At block 704, a target-lock subtargeting mode is activated after the predetermined time period elapses.

At block 706, it is detected if movement of an analog directional input is of a predetermined distance. If not, then the method continues at block 710. If the analog directional input is detected to be moved the predetermined distance, which indicates that the user wishes to break the target lock, then at block 708 the target lock is relinquished from the magnetic object.

At block 710, it is detected if there is movement of the directional input. If not, then the method continues at block 706 for additional monitoring for movement of the directional input. If, on the other hand, movement of the directional input is detected, which is less than the predetermined distance, then at block 712 the location of the target indicator is moved to a subtargeted area on the magnetic object to which the target indicator is locked. This movement of the target indicator is made responsive to the detection of the directional input movement of less than the predetermined distance.

Figure 8A:
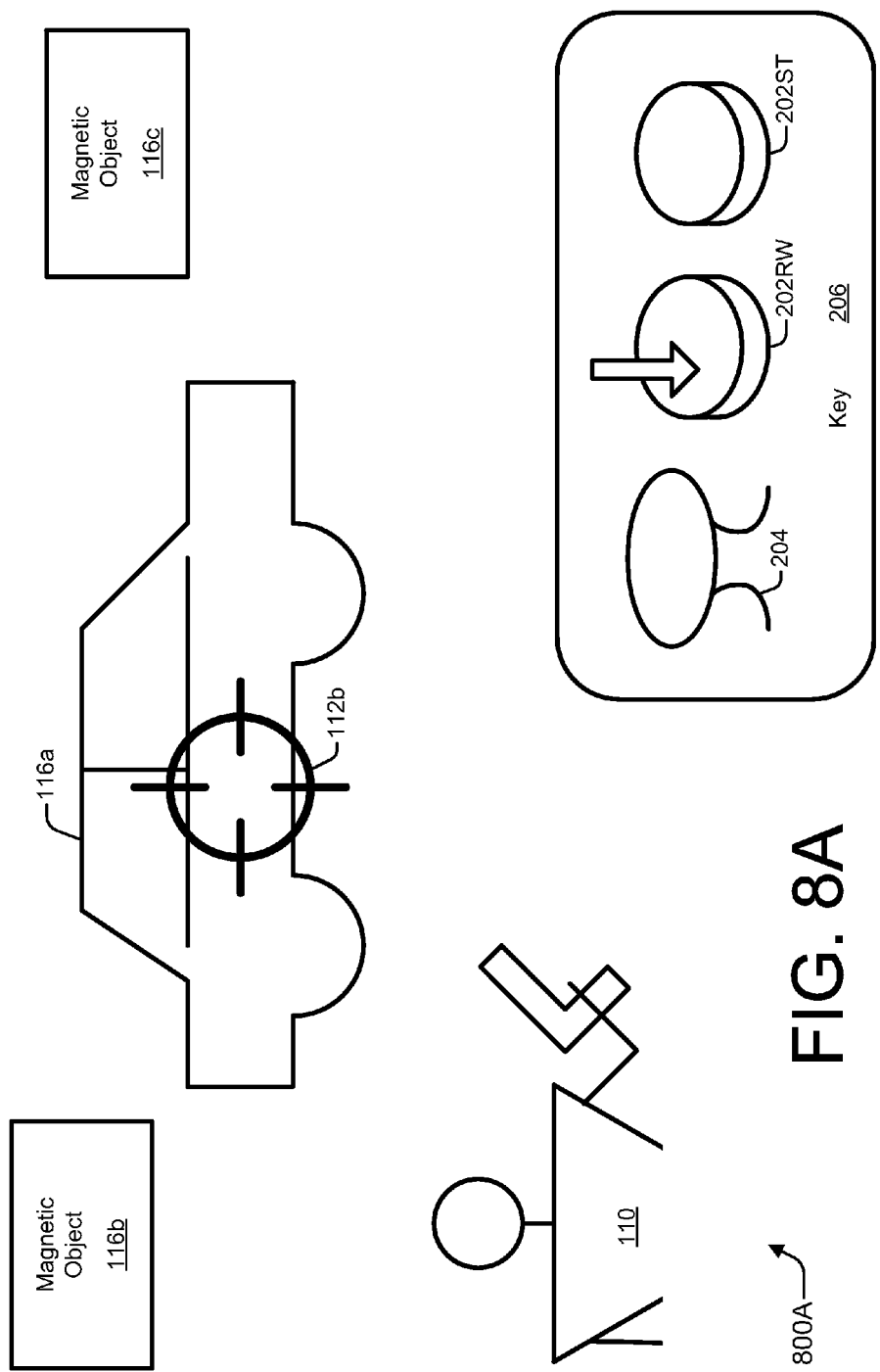
FIGS. 8A-8C illustrate an example target-lock subtargeting mode using two buttons for targeting control in a simulated environment.
Figure 8B:
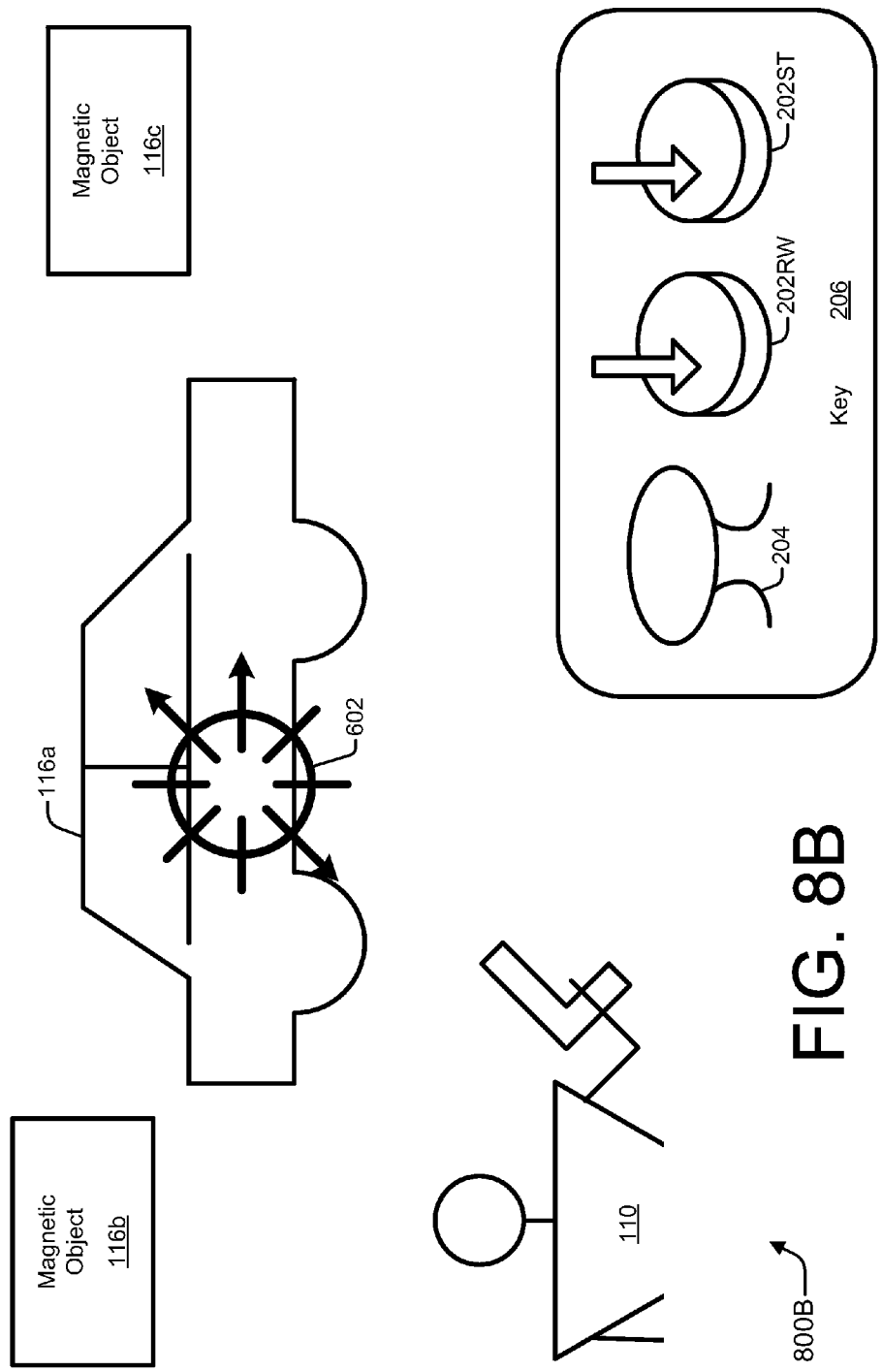
Figure 8C:
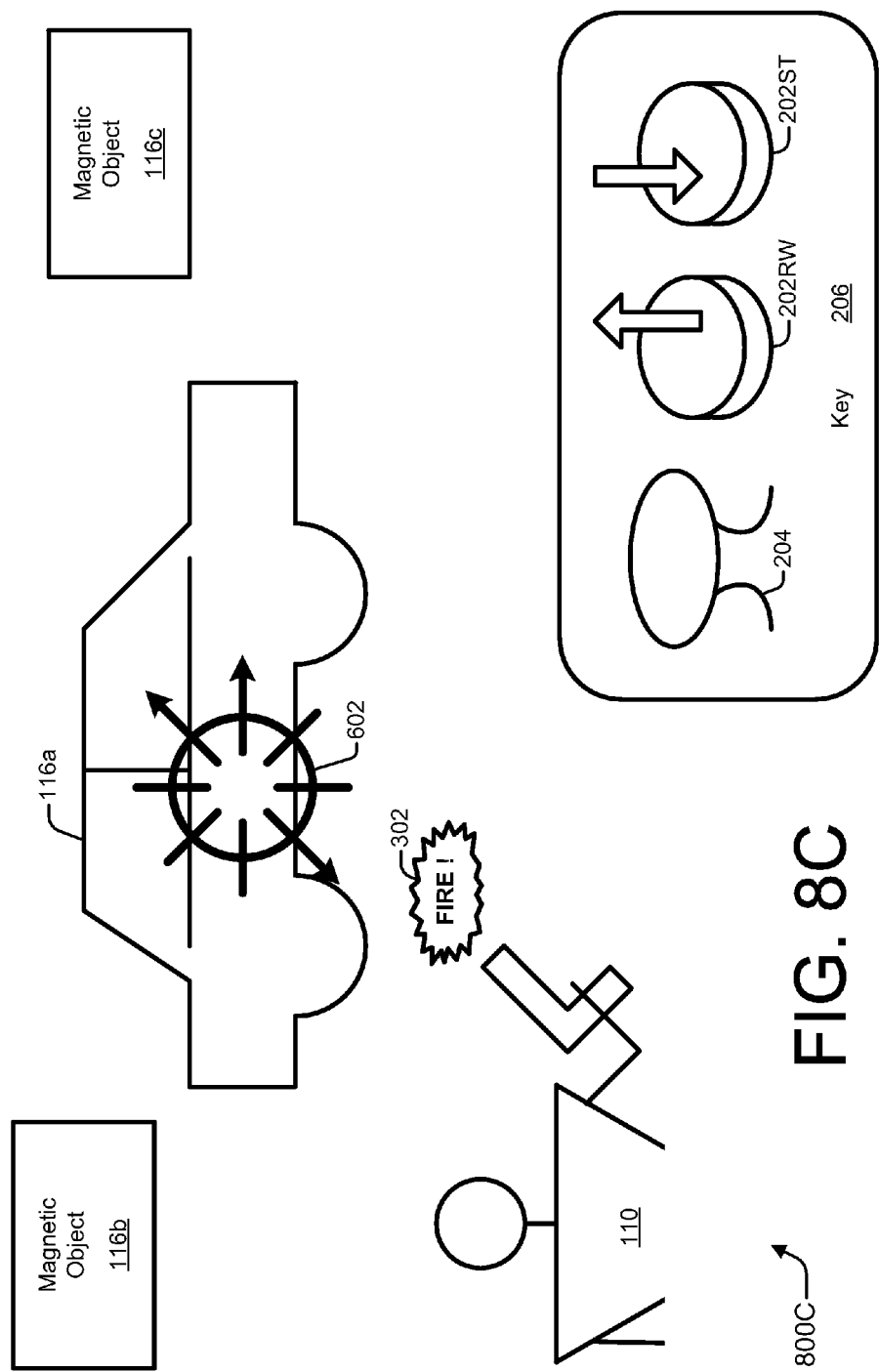

FIGS. 8A-8C illustrate an example target-lock subtargeting mode using two buttons for targeting control in a simulated environment. FIGS. 8A-8C jointly illustrate an example operational embodiment. In these example embodiments, first and second button inputs 202 (as shown in key 206) are involved to control the target-lock subtargeting mode. Specifically, the user is capable of accessing a ranged weapon button input 202RW and a subtargeting button input 202ST.

By way of example only, ranged weapon button input 202RW may be a surface button input 202A,B,C,D (of FIG. 2), and subtargeting button input 202ST may be a shoulder button input 202L,R. Directional input 204 may be an analog or a digital directional input 204.

With reference to FIG. 8A, as illustrated generally at 800A, a target-lock subtargeting mode has not yet been activated. As shown by key 206, a user continues to hold ranged weapon button input 202RW. At least partially in response to this pressing and holding, a target lock has been established on magnetic object 116a. Thus, target indicator 112b tracks the position of magnetic object 116a around simulated environment 102, at least while it remains in view of player character 110. With the two-button approach, elapsed time alone does not precipitate activation of a target-lock subtargeting mode.

With reference to FIG. 8B, as illustrated generally at 800B, a target-lock subtargeting mode has been activated. As shown by key 206, a user is pressing and holding subtargeting button input 202ST. In response to detection of at least the pressing of subtargeting button input 202ST, the target-lock subtargeting mode is activated.

By way of example only, the target-lock subtargeting UI of FIG. 6A is shown in FIG. 8B. Thus, a target indicator 602 replaces target indicator 112 at magnetic object 116a. Also, three crosshairs have arrows further indicating specific subtargeting areas that are available on magnetic object 116a. While the target-lock subtargeting mode is active, movement of directional input 204 causes target indicator 602 to move around magnetic object 116a to other subtargeting areas.

With reference to FIG. 8C, as illustrated generally at 800C, a firing 302 occurs during the target-lock subtargeting mode. As indicated by key 206, the user continues to hold subtargeting button input 202ST. The user releases ranged weapon button input 202RW. In response to detection of the release of ranged weapon button input 202RW, the ranged weapon is fired 302 based on the current location of target indicator 602. The firing of the ranged weapon may deactivate the target-lock subtargeting mode and/or may terminate the fine aiming mode.

After the ranged weapon is fired, subtargeting button input 202ST may be released. In this implementation of two-button subtargeting embodiments, the user presses and holds subtargeting button input 202ST to activate and maintain the target-lock subtargeting mode. If the user releases subtargeting button input 202ST prior to releasing ranged weapon button input 202RW, the target-lock subtargeting mode is deactivated.

Alternatively, in another implementation of two-button subtargeting embodiments, the user may release the subtargeting button input 202ST at any time. In other words, the target-lock subtargeting mode may be activated in response to at least the subtargeting button input 202ST being pressed (and/or released the first time). The target-lock subtargeting mode may be deactivated when the ranged weapon is fired, when the user presses (and/or releases) subtargeting button input 202ST a second time, and so forth.

It should be understood that the various alternative UI and subtargeting mechanism embodiments of FIGS. 6A-6E may be utilized in two-button target-lock subtargeting mode embodiments. Also, it should be noted that pressing subtargeting button input 202ST (in either the holding or the two tapping implementation for two-button embodiments) may disable the target-lock breaking embodiment described herein above with particular reference to FIG. 4D and blocks 706 and 708 of FIG. 7.

Figure 9:
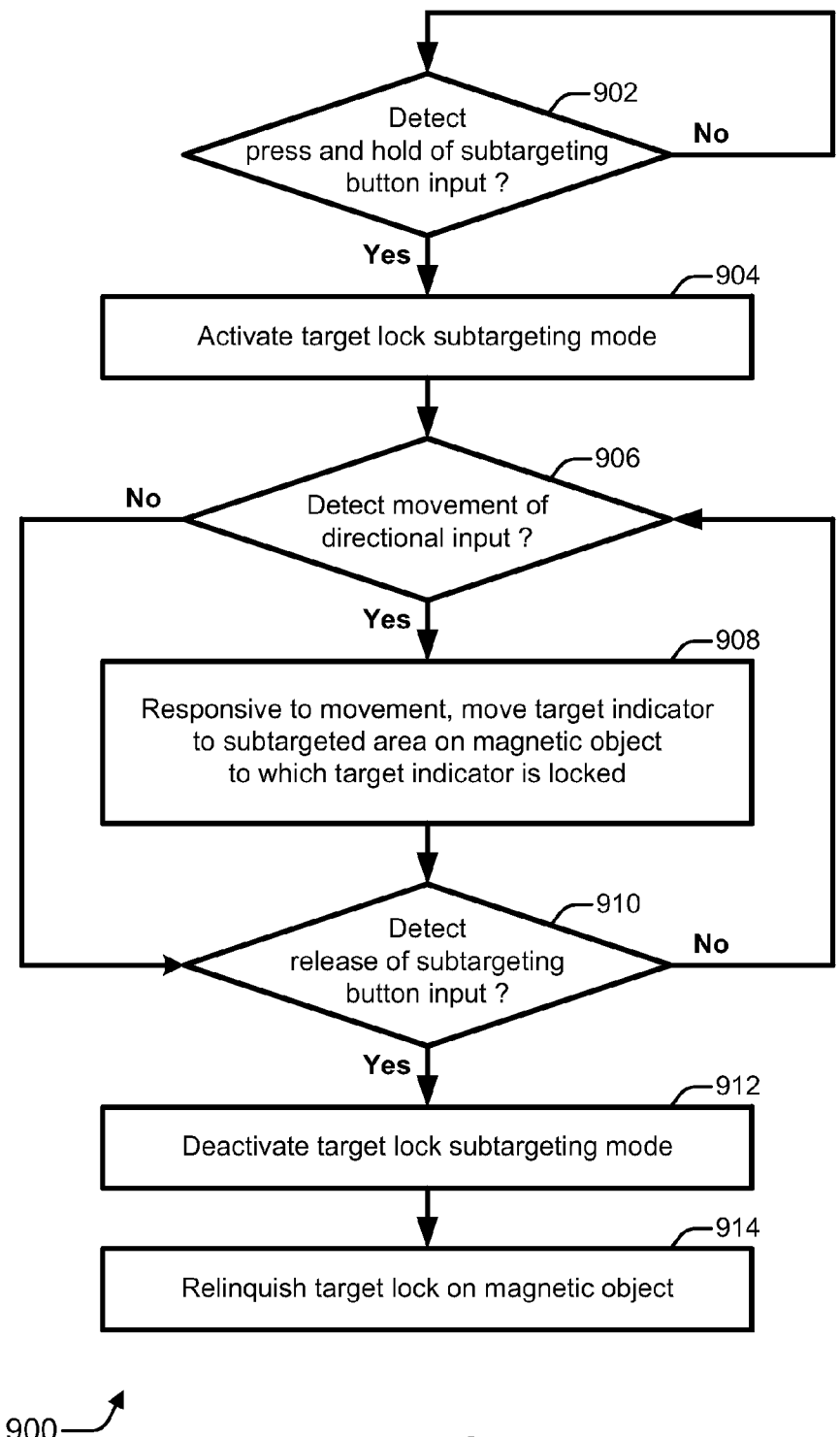
FIG. 9 is a flow diagram that illustrates an example of a method for implementing a target-lock subtargeting mode using two buttons for targeting control in a simulated environment.

FIG. 9 is a flow diagram 900 that illustrates an example of a method for implementing a target-lock subtargeting mode using two buttons for targeting control in a simulated environment. Flow diagram 900 includes seven blocks 902-914. Implementations of flow diagram 900 may be realized, for example, as processor-executable instructions and/or by a targeting controller 106 (of FIG. 1). Flow diagram 900 is directed to scenarios in which a target lock has been established on a magnetic object.

For certain example embodiments, starting at block 902, it is detected if a subtargeting button input is pressed and held (or at least pressed once). If not, monitoring of the designated subtargeting button input continues at block 902. If the subtargeting button input is detected to be pressed, then at block 904 a target-lock subtargeting mode is activated.

At block 906, it is detected if there is movement of the directional input. If not, then the method continues at block 910. If movement of the directional input is detected, then at block 908 the target indicator is moved to a subtargeted area on the magnetic object to which the target indicator is locked responsive to the detected movement.

At block 910, it is detected if the subtargeting button input is released (as part of a first press and hold or as part of a second tap). If not, then the method continues at block 906 for further monitoring of the directional input for movement thereof. If the subtargeting button input is detected (at block 910) to be released, then at block 912 the target-lock subtargeting mode is deactivated. This manual deactivation of the target-lock subtargeting mode may also cause the target lock on the magnetic object to be relinquished at block 914, and/or the manual deactivation may re-enable target locking breaking by moving a directional input a predetermined distance.

Figure 10:
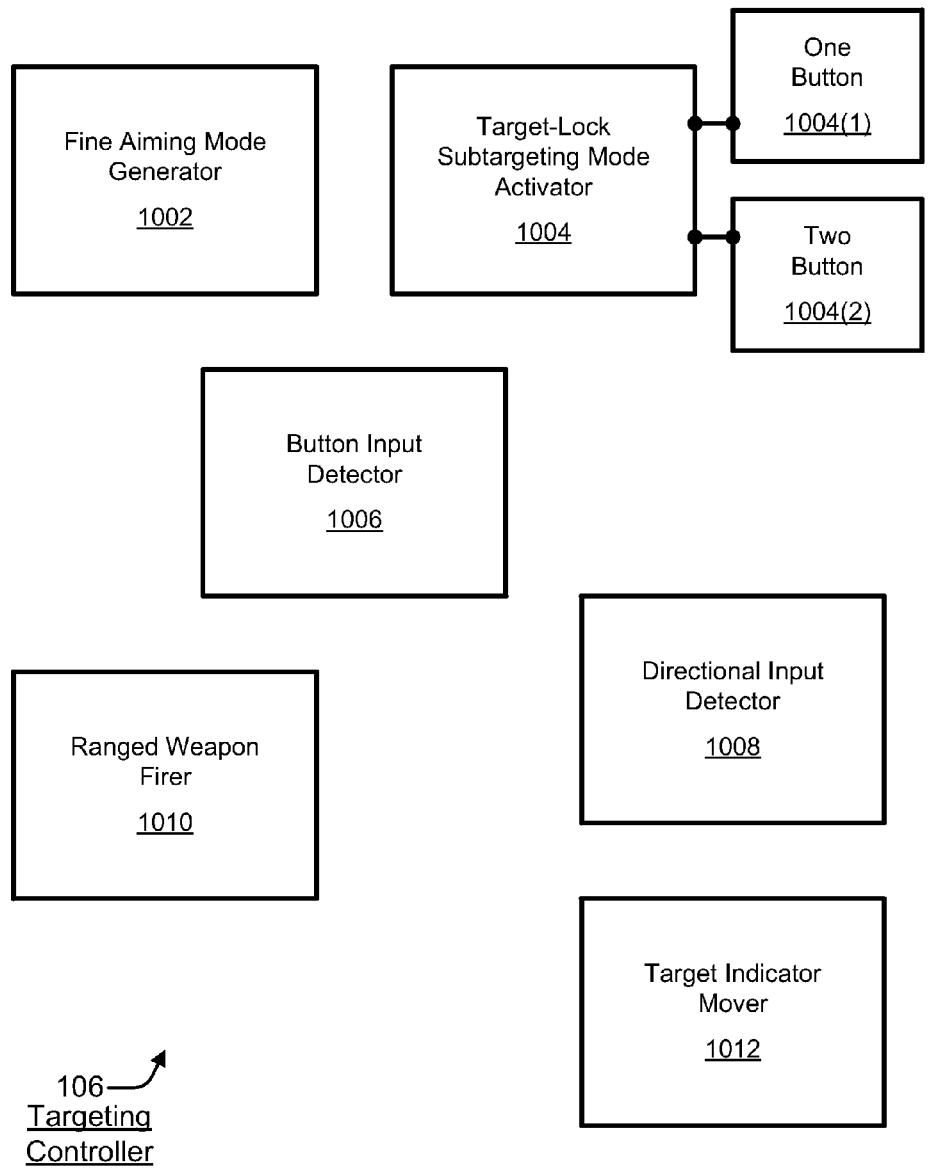
FIG. 10 is a block diagram of example components for a targeting controller of a simulated environment creator.

FIG. 10 is a block diagram of example components for a targeting controller 106 of a simulated environment creator 104 (of FIG. 1). As illustrated, targeting controller 106 includes a fine aiming mode generator 1002, a target-lock subtargeting mode activator 1004, a button input detector 1006, a directional input detector 1008, a ranged weapon firer 1010, and a target indicator mover 1012. Target-lock subtargeting mode activator 1004 may be implemented using a one button component 1004(1) and/or a two button component 1004(2).

For certain general example embodiments, fine aiming mode generator 1002 is to generate a fine aiming mode, such as those that are depicted in FIGS. 4A-4D, responsive to a press and a hold of a first button input. Button input detector 1006 and directional input detector 1008 are to monitor button inputs and directional inputs, respectively. Detected button inputs may be presses and releases (e.g., taps), presses and holds, releases, combinations thereof, and so forth. Detected directional inputs may be digital in nature, analog in nature, any movements along any permissible direction, movements of a predetermined distance, combinations thereof, and so forth.

Ranged weapon firer 1010 is to fire a ranged weapon responsive to detections of button inputs. Target indicator mover 1012 is to move a target indicator responsive to detections of movements of directional inputs during the fine aiming mode, including during target-lock subtargeting modes. Target-lock subtargeting mode activator 1004 is to activate a target-lock subtargeting mode. Target-lock subtargeting mode activator 1004 may be implemented with one-button component 1004(1) in which the target-lock subtargeting mode is activated based on predetermined period of time that may elapse once a fine aiming mode is generated. Alternatively, target-lock subtargeting mode activator 1004 may be implemented with two-button component 1004(2) in which the target-lock subtargeting mode is activated based on at least a press of a second, subtargeting button input.

For certain example specific embodiments, a device with targeting control for a simulated environment includes a targeting controller 106. The targeting controller 106 includes a button input detector 1006, a directional input detector 1008, a fine aiming mode generator 1002, a target indicator mover 1012, and a ranged weapon firer 1010. Button input detector 1006 is to monitor a button input. Directional input detector 1008 is to monitor a directional input.

Fine aiming mode generator 1002 is to generate a fine aiming mode if button input detector 1006 detects a press and hold of the button input. Target indicator mover 1012 is to move a location of a target indicator if directional input detector 1008 detects movement of the directional input during the fine aiming mode. Ranged weapon firer 1010 is to fire a ranged weapon based on the location of the target indicator if button input detector 1006 detects a release of the button input.

In a more specific example embodiment, fine aiming mode generator 1002 is to switch to a camera view of the simulated environment that is conducive to aiming the target indicator from a perspective of a player character. Fine aiming mode generator 1002 is to precipitate a target lock to be established on a magnetic object of the simulated environment when the location of the target indicator is determined to be sufficiently proximate to the magnetic object. The target lock is to cause the location of the target indicator to track a position of the magnetic object.

In another more specific example embodiment, targeting controller 106 may further include a target-lock subtargeting mode activator 1004. Target-lock subtargeting mode activator 1004 is to activate a target-lock subtargeting mode during the target lock on the magnetic object. The target-lock subtargeting mode is to enable a user to move the target indicator to a subtargeted area of the magnetic object to which the targeted indicator is currently locked.

In a still more specific example embodiment, target-lock subtargeting mode activator 1004 may include a one-button component 1004(1) or a two-button component 1004(2). One-button component 1004(1) is to automatically activate the target-lock subtargeting mode once a predetermined time period elapses after establishment of the target lock. Two-button component 1004(2) is to activate the target-lock subtargeting mode if button input detector 1006 detects a press, a press and hold, or a release of a subtargeted button input.

In another more specific example embodiment, the directional input is an analog directional input. Fine aiming mode generator 1002 is to relinquish the target lock on the magnetic object if directional input detector 1008 detects movement of the analog directional input of a predetermined distance.

3: Example Device Implementations for Targeting Control in a Simulated Environment FIG. 11 is a block diagram 1100 illustrating example devices 1102 that may be used to implement embodiments for targeting control in a simulated environment. As illustrated, block diagram 1100 includes two devices 1102a and 1102b, person-device interface equipment 1112, and one or more network(s) 1114. As explicitly shown with device 1102a, each device 1102 may include one or more input/output interfaces 1104, at least one processor 1106, and one or more media 1108. Media 1108 may include processor-executable instructions 1110.

For example embodiments, device 1102 may represent any processing-capable device. Examples of devices 1102 include personal or server computers, hand-held electronics, entertainment appliances (e.g., including portable gaming devices, console gaming devices, etc.), network components, some combination thereof, and so forth. Device 1102a and device 1102b may communicate over network(s) 1114. Network(s) 1114 may be, by way of example but not limitation, an internet, an intranet, an Ethernet, a public network, a private network, a cable network, a digital subscriber line (DSL) network, a telephone network, a wireless network, a gaming network, some combination thereof, and so forth. Person-device interface equipment 1112 may be a keyboard/keypad, a touch screen, a remote, a mouse or other graphical pointing device, a player input device 108 (of FIGS. 1 and 2) (e.g., a gaming controller), a screen, a speaker, and so forth.

I/O interfaces 1104 may include (i) a network interface for monitoring and/or communicating across network 1114, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly with person-device interface equipment 1112.

Processor 1106 may be implemented using any applicable processing-capable technology, and one may be realized as a general-purpose or a special-purpose processor. Examples include a central processing unit (CPU), a microprocessor, a controller, a graphics processing unit (GPU), an application-specific integrated circuit (ASIC), a derivative or combination thereof, and so forth. Media 1108 may be any available media that is included as part of and/or is accessible by device 1102. It includes volatile and non-volatile media, removable and non-removable media, storage and transmission media (e.g., wireless or wired communication channels), hard-coded logic media, combinations thereof, and so forth. Media 1108 is tangible media when it is embodied as a manufacture and/or as a composition of matter.

Generally, processor 1106 is capable of executing, performing, and/or otherwise effectuating processor-executable instructions, such as processor-executable instructions 1110. Media 1108 is comprised of one or more processor-accessible media. In other words, media 1108 may include processor-executable instructions 1110 that are executable by processor 1106 to effectuate the performance of functions by device 1102. Processor-executable instructions 1110 may be embodied as software, firmware, hardware, fixed logic circuitry, some combination thereof, and so forth.

Thus, realizations for targeting control in a simulated environment may be described in the general context of processor-executable instructions. Processor-executable instructions may include routines, programs, applications, coding, modules, protocols, objects, components, logic, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

As specifically illustrated, media 1108 comprises at least processor-executable instructions 1110. Processor-executable instructions 1110 may comprise, for example, a simulated environment creator 104 (of FIG. 1), a targeting controller 106 (of FIGS. 1 and 10), logic and/or coding that is capable of implementing the simulated environments 102 and targeting control UIs thereof that are described herein and illustrated in the accompanying drawings, some combination thereof, and so forth. Generally, processor-executable instructions 1110, when executed by processor 1106, enable device 1102 to perform the various functions described herein. Such functions also include, by way of example but not limitation, those that are illustrated in the various flow diagrams and those pertaining to features illustrated in the block diagrams, as well as combinations thereof, and so forth.

The devices, acts, features, functions, methods, modules, data structures, techniques, components, etc. of FIGS. 1-11 are illustrated in diagrams that are divided into multiple blocks and other elements. However, the order, interconnections, interrelationships, layout, etc. in which FIGS. 1-11 are described and/or shown are not intended to be construed as a limitation, and any number of the blocks and/or other elements can be modified, combined, rearranged, augmented, omitted, etc. in any manner to implement one or more systems, methods, devices, media, apparatuses, arrangements, etc. for targeting control in a simulated environment.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. A device comprising a processor, the processor being programmed to execute instructions for targeting control in a simulated environment, wherein the instructions, when executed by the processor, direct the device to perform acts of:
   monitoring a button input and an analog directional input;
   on detecting a press and hold of the button input, generating a fine aiming mode for the simulated environment; and
   during the fine aiming mode:
   on detecting a movement of the directional input, moving a location of a target indicator responsive to the movement;
   tracking the location of the target indicator;
   on determining the location of the target indicator to be proximate to a magnetic object of the simulated environment, automatically locking the target indicator to the magnetic object to establish a target lock, the target lock causing the location of the target indicator to remain locked to the magnetic object while the magnetic object remains in view within the simulated environment;
   during the target lock, activating a target-lock subtargeting mode;
   on detecting movement of the analog directional input of a predetermined distance during the target-lock subtargeting mode, relinquishing the target lock on the magnetic object and moving the target indicator in a direction of the movement of the analog directional input;
   on detecting movement of the analog directional input that is less than the predetermined distance during the target-lock subtargeting mode, moving the location of the target indicator to a subtargeted area of the magnetic object to which the target indicator is locked responsive to the movement of the analog directional input that is less than the predetermined distance, and
   when a release of the button input is detected, firing a ranged weapon based on the location of the target indicator.

2. The device as recited in claim 1, wherein at least a portion of the instructions comprise a video game program that is adapted to be executed on a video gaming device.

3. The device as recited in claim 1, wherein the predetermined distance comprises a maximally-permissible physical amount of movement for the analog directional input.

4. The device as recited in claim 1, wherein the magnetic object is attractive to the target indicator during the fine aiming mode.

5. The device as recited in claim 1, wherein the target-lock subtargeting mode is indicated by a change in appearance of the target indicator.

6. A device-implemented method for targeting control in a simulated environment, the method comprising acts of:
   monitoring a button input by one or more processors;
   on detecting a press and hold of the button input, generating a fine aiming mode;
   monitoring a directional input;
   on detecting a movement of the directional input during the fine aiming mode, moving a location of a target indicator responsive to the movement;
   on determining the location of the target indicator to be proximate to a magnetic object during the fine aiming mode, automatically locking the target indicator to the magnetic object to establish a target lock;
   during the target lock, activating a target-lock subtargeting mode;
   on detecting movement of the directional input of a predetermined distance during the target-lock subtargeting mode, relinquishing the target lock on the magnetic object and moving the target indicator in a direction of the movement of the directional input;
   on detecting movement of the directional input that is less than the predetermined distance during the target-lock subtargeting mode, moving the location of the target indicator to a subtargeted area of the magnetic object to which the target indicator is locked responsive to the movement of the directional input that is less than the predetermined distance, and on detecting a release of the button input, firing a ranged weapon based on the location of the target indicator.

7. The method as recited in claim 6, wherein:

the act of moving comprises moving the location of the target indicator on a user interface of the simulated environment on a display screen; and the act of firing comprises firing the ranged weapon based on the location of the target indicator on the user interface of the simulated environment on the display screen.

8. The method as recited in claim 6, wherein:

the act of locking comprises causing the location of the target indicator to remain locked to the magnetic object while the magnetic object remains in view within the simulated environment.

9. The method as recited in claim 8, wherein the directional input comprises an analog directional input; and wherein the target-lock subtargeting mode is automatically activated once a predetermined time period elapses after the target lock is established.

10. The method as recited in claim 9, wherein the predetermined distance comprises a maximally-permissible physical amount of movement for the analog directional input.

11. The method as recited in claim 9, wherein the magnetic object is attractive to the target indicator during the fine aiming mode.

12. The method as recited in claim 6, wherein the act of generating comprises an act of:

causing a player character to be stationary within the simulated environment even as the directional input is moved during the fine aiming mode; and presenting the target indicator in a user interface that is displaying at least a portion of the simulated environment.

13. The method as recited in claim 6, wherein the target-lock subtargeting mode is indicated by a change in appearance of the target indicator.

14. The method as recited in claim 6, wherein the target indicator tracks a position of the magnetic object while a view of the magnetic object remains unblocked.

15. A device with targeting control for a simulated environment, the device comprising:

a targeting controller including a button input detector, a directional input detector, a fine aiming mode generator, a target-lock subtargeting mode activator, a target indicator mover, and a ranged weapon firer; wherein:

the button input detector monitoring a button input;

the directional input detector monitoring a directional input;

the fine aiming mode generator generating a fine aiming mode when the button input detector detects a press and hold of the button input;

the target indicator mover moving a location of a target indicator when the directional input detector detects movement of the directional input during the fine aiming mode;

the fine aiming mode generator establishing a target lock on a magnetic object of the simulated environment when the location of the target indicator is determined to be sufficiently proximate to the magnetic object during the fine aiming mode;

during the target lock, the target-lock subtargeting mode activator activating a target-lock subtargeting mode;

on detecting movement of the directional input of a predetermined distance during the target-lock subtargeting mode, the target-lock subtargeting mode activator relinquishing the target lock on the magnetic object and moving the target indicator in a direction of the movement of the directional input;

on detecting movement of the directional input that is less than the predetermined distance during the target-lock subtargeting mode, the target-lock subtargeting mode activator moving the location of the target indicator to a subtargeted area of the magnetic object to which the target indicator is locked responsive to the movement of the directional input that is less than the predetermined distance; and the ranged weapon firing a ranged weapon based on the location of the target indicator when the button input detector detects a release of the button input.

16. The device as recited in claim 15, wherein the fine aiming mode generator switches to a camera view of the simulated environment that is conducive to aiming the target indicator from a perspective of a player character and causes the location of the target indicator to track a position of the magnetic object while a view of the magnetic object remains unblocked from the perspective of the player character.

17. The device as recited in claim 16, wherein the magnetic object is attractive to the target indicator during the fine aiming mode.

18. The device as recited in claim 15, wherein the target-lock subtargeting mode is indicated by a change in appearance of the target indicator.

19. The device as recited in claim 15, wherein the directional input comprises an analog directional input, and wherein the predetermined distance comprises a maximally-permissible physical amount of movement for the analog directional input.

20. The device as recited in claim 15, wherein the device comprises a video gaming device.

* * * * *